United States Patent
Fujita et al.

(10) Patent No.: US 12,287,616 B2
(45) Date of Patent: Apr. 29, 2025

(54) NUMERICAL CONTROLLER, NUMERICAL CONTROL MACHINE TOOL, MACHINING PROGRAM GENERATION DEVICE, AND MACHINING PROGRAM GENERATION METHOD

(71) Applicants: Mitsubishi Electric Corporation, Tokyo (JP); Yamazaki Mazak Corporation, Aichi (JP)

(72) Inventors: Tomoya Fujita, Tokyo (JP); Takeshi Kubo, Tokyo (JP); Hiroyuki Kinoshita, Tokyo (JP); Junji Matsuno, Tokyo (JP); Kohei Hibino, Aichi (JP); Takuya Hirao, Aichi (JP); Akira Iseki, Aichi (JP)

(73) Assignees: Mitsubishi Electric Corporation, Tokyo (JP); Yamazaki Mazak Corporation, Aichi (JP)

( * ) Notice: Subject to any disclaimer, the term of this patent is extended or adjusted under 35 U.S.C. 154(b) by 0 days.

(21) Appl. No.: 18/863,655

(22) PCT Filed: Jul. 14, 2022

(86) PCT No.: PCT/JP2022/027773
§ 371 (c)(1),
(2) Date: Nov. 7, 2024

(87) PCT Pub. No.: WO2024/013955
PCT Pub. Date: Jan. 18, 2024

(65) Prior Publication Data
US 2025/0110468 A1 Apr. 3, 2025

(51) Int. Cl.
*G05B 19/404* (2006.01)
*B23Q 15/12* (2006.01)

(52) U.S. Cl.
CPC .......... *G05B 19/404* (2013.01); *B23Q 15/12* (2013.01); *G05B 2219/37506* (2013.01)

(58) Field of Classification Search
None
See application file for complete search history.

(56) References Cited

U.S. PATENT DOCUMENTS

| | | | |
|---|---|---|---|
| 2016/0282846 A1* | 9/2016 | Nagaoka | ............ G05B 19/4062 |
| 2019/0386595 A1 | 12/2019 | Fujita et al. | |
| 2021/0036640 A1 | 2/2021 | Fujita et al. | |

FOREIGN PATENT DOCUMENTS

| | | |
|---|---|---|
| CN | 105234743 A | 1/2016 |
| JP | H04-020103 U | 2/1992 |

(Continued)

OTHER PUBLICATIONS

International Search Report and Written Opinion mailed on Sep. 13, 2022, received for PCT Application PCT/JP2022/027773, filed on Jul. 14, 2022, 8 pages including English Translation.

(Continued)

*Primary Examiner* — Ryan A Jarrett
(74) *Attorney, Agent, or Firm* — XSENSUS LLP

(57) ABSTRACT

A numerical controller includes: a model holding unit that holds a machine model, the machine model being a model that simulates deformation of a mechanical structure accompanying motion of the mechanical structure in axial directions and representing an error amount as an amount of displacement of a tool; a machining error estimation unit that estimates an error direction and the error amount in the error direction on the basis of axis data that is data on drive of a drive mechanism and the machine model, the error direction being a direction in which displacement of the tool occurs among the axial directions; and a correction amount arithmetic unit that selects one or more of the axes subject to correction, and performs arithmetic to find a correction (Continued)

amount used for correction of a command to be output to the drive mechanism for the axis selected.

20 Claims, 24 Drawing Sheets

(56) References Cited

FOREIGN PATENT DOCUMENTS

| | | | |
|---|---|---|---|
| JP | H08-297508 | A | 11/1996 |
| JP | 2000-322115 | A | 11/2000 |
| JP | 2000-322116 | A | 11/2000 |
| JP | 2016-051398 | A | 4/2016 |
| JP | 6567205 | B1 | 8/2019 |

OTHER PUBLICATIONS

Notice of Reason for Refusal mailed on Jan. 17, 2023, received for JP Application 2022-569153, 6 pages including English Translation.
Notice of Decision of Grant mailed on Apr. 11, 2023, received for JP Application 2022-569153, 5 pages including English Translation.

\* cited by examiner

NUMERICAL CONTROLLER, NUMERICAL CONTROL MACHINE TOOL, MACHINING PROGRAM GENERATION DEVICE, AND MACHINING PROGRAM GENERATION METHOD

CROSS-REFERENCE TO RELATED APPLICATION

The present application is based on PCT filing PCT/JP2022/027773, filed Jul. 14, 2022, the entire contents of which is incorporated herein by reference.

FIELD

The present disclosure relates to a numerical controller that controls a numerical control machine tool, the numerical control machine tool, a machining program generation device, and a machining program generation method.

BACKGROUND

A machine tool is a mechanical device that performs machining to obtain a desired shape by driving an axis in accordance with a machining program. The machine tool that performs removal machining removes an unnecessary portion of a material, thereby machining the material into a target shape. The removal of the material is performed using various tools such as a drill, a milling cutter, an end mill, a grinding wheel, a turning tool, a discharge wire, or a discharge electrode, or laser light. Such a machine tool uses a motor and a detector attached to the axis to perform feedback control for matching a locus of the tool with a locus specified in the machining program.

When the locus of the tool at the time of machining is different from the locus specified in the machining program, a machining error occurs. Even if the axis is driven in accordance with a command, a mechanical structure of the machine tool may undergo elastic deformation, which may result in the machining error caused by the tool biting into a machining surface to remove the material excessively, or the machining error caused by the tool being lifted off the machining surface to leave the material unremoved. The elastic deformation of the mechanical structure can be caused by an inertial force accompanying acceleration/deceleration of the axis. As a result of such a machining error, a visible machining mark may be left on a surface of a machined product, and the machined product may be determined to have a machining defect in a visual inspection thereof. Since such a machining error cannot be detected depending on the position of the detector attached, the machining error may not be reduced by normal feedback control. In response to such a problem, a technique has been proposed in which the command is corrected by predicting the machining error on the basis of the acceleration of the axis.

Patent Literature 1 discloses a motor controller that corrects a position command of an axis that is a correction target on the basis of a correction amount when a machining error occurs in a direction different from a direction of motion of a mechanical structure caused by driving of the axis, the correction amount being obtained by multiplying acceleration of the axis being driven by a gain.

CITATION LIST

Patent Literature

Patent Literature 1: Japanese Patent Application Laid-open No. 2016-51398

SUMMARY OF INVENTION

Problem to be Solved by the Invention

However, in the technique of Patent Literature 1 above, the direction in which the machining error occurs may not coincide with the direction of motion of the mechanical structure. In this case, it is difficult for the motor controller to perform correction that reduces the machining error. Thus, the technique of Patent Literature 1 above has a problem that it is difficult in some cases to reduce the machining error caused by deformation of the mechanical structure.

The present disclosure has been made in view of the above, and an object of the present disclosure is to provide a numerical controller capable of reducing a machining error due to deformation of a mechanical structure.

Means to Solve the Problem

To solve the above problem and achieve an object, a numerical controller according to the present disclosure controls a numerical control machine tool, the numerical control machine tool including a drive mechanism provided for each of a plurality of axes, including a mechanical structure to perform motion by power that is transmitted from the drive mechanism, and machining a workpiece using a tool attached to the mechanical structure. The numerical controller according to the present disclosure includes: a model holding unit that holds a machine model, the machine model being a model that simulates deformation of the mechanical structure accompanying the motion of the mechanical structure in axial directions and representing an error amount as an amount of displacement of the tool in the axial directions due to the deformation of the mechanical structure, the axial directions being directions of corresponding ones of the plurality of the axes; a machining error estimation unit to estimate an error direction and the error amount in the error direction on the basis of axis data that is data on drive of the drive mechanism and the machine model, and output machining error information indicating the error direction estimated and the error amount estimated, the error direction being a direction in which displacement of the tool occurs among the axial directions; and a correction amount arithmetic unit to select one or more of the axes subject to correction on the basis of the machining error information, and perform arithmetic to find a correction amount that is used for correction of a command to be output to the drive mechanism for the axis selected.

Effects of the Invention

The numerical controller according to the present disclosure has an effect of being able to reduce the machining error due to the deformation of the mechanical structure.

DESCRIPTION OF EMBODIMENTS

Hereinafter, a numerical controller, a numerical control machine tool, a machining program generation device, and a machining program generation method will be described in detail with reference to the drawings.

First Embodiment

Figure 1:
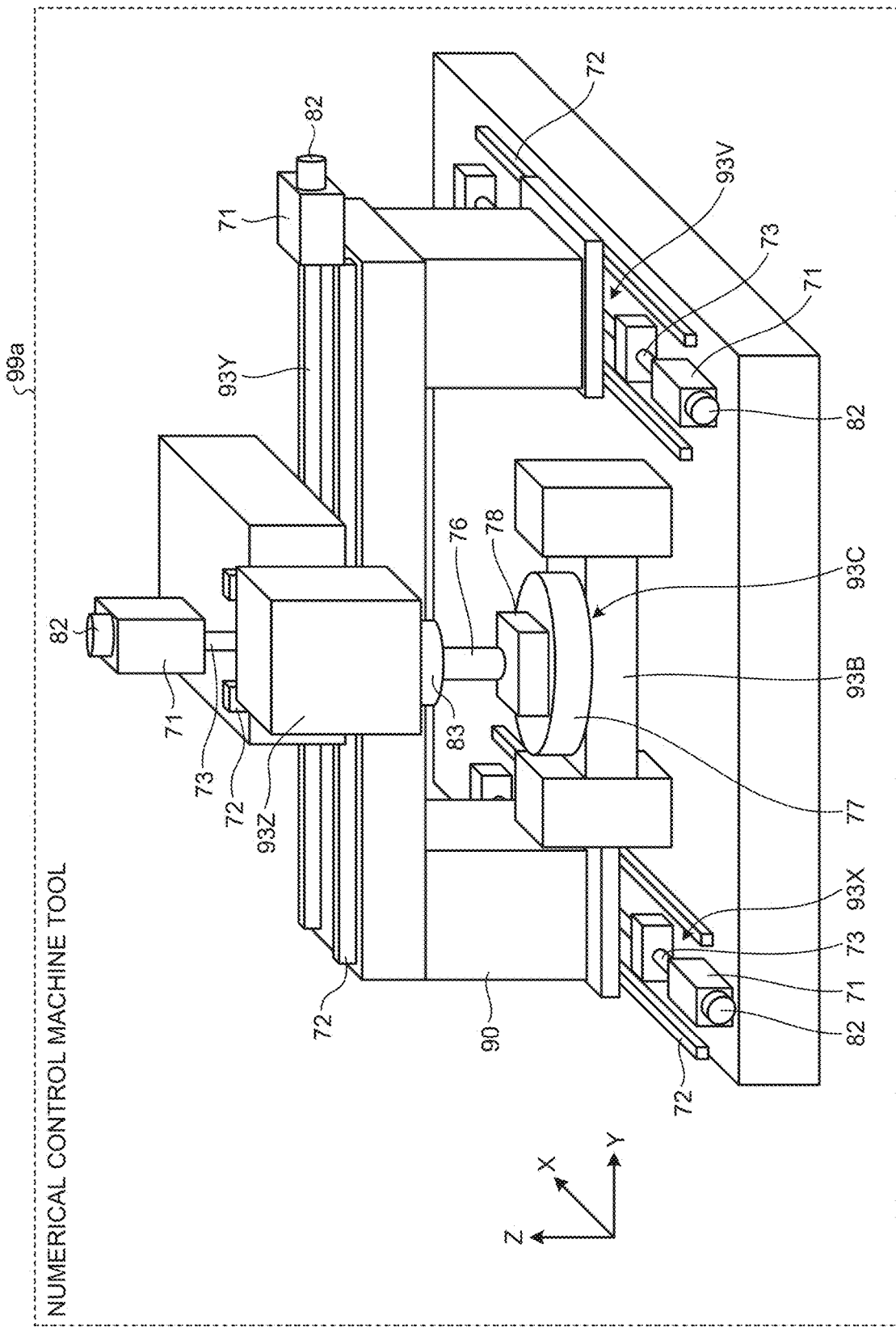
FIG. 1 is a diagram illustrating an exemplary configuration of a numerical control machine tool according to a first embodiment.

FIG. 1 is a diagram illustrating an exemplary configuration of a numerical control machine tool 99a according to a first embodiment. The numerical control machine tool 99a is a machine tool that drives an axis in accordance with a machining program. The numerical control machine tool 99a is a five-axis control machining center. The numerical control machine tool 99a includes an X-axis drive unit 93X, a V-axis drive unit 93V, a Y-axis drive unit 93Y, a Z-axis drive unit 93Z, a B-axis drive unit 93B, a C-axis drive unit 93C, and a spindle 83. The X-axis drive unit 93X and the V-axis drive unit 93V drive the Y-axis drive unit 93Y in an X direction. The Y-axis drive unit 93Y drives the Z-axis drive unit 93Z in a Y direction. The Z-axis drive unit 93Z drives the spindle 83 in a Z direction. The spindle 83 rotates a tool 76. A workpiece 78 to be machined is placed on a work table 77. The C-axis drive unit 93C rotates the work table 77 about a Z axis. The B-axis drive unit 93B rotates the C-axis drive unit 93C about a Y axis.

The numerical control machine tool 99a uses the X-axis drive unit 93X, the V-axis drive unit 93V, the Y-axis drive unit 93Y, and the Z-axis drive unit 93Z to move the spindle 83 and uses the B-axis drive unit 93B and the C-axis drive unit 93C to change the posture of the workpiece 78, thereby moving the tool 76 and the workpiece 78 relatively to each other. The numerical control machine tool 99a rotates the tool 76 and cuts a surface of the workpiece 78 while moving the tool 76 and the workpiece 78 relatively to each other. The numerical control machine tool 99a removes an unnecessary portion from the workpiece 78 to machine the workpiece 78 into a target shape.

Work performed by the numerical control machine tool 99a is to drive each axis in accordance with the machining program and achieve a machined shape of the workpiece 78 by cutting. Whether or not the machined shape of the workpiece 78 meets a predetermined standard, specifically, whether or not shape accuracy and surface accuracy as designed in advance are met determines whether or not machining by the numerical control machine tool 99a is performed successfully.

The X-axis drive unit 93X, the V-axis drive unit 93V, the Y-axis drive unit 93Y, and the Z-axis drive unit 93Z each cause a driven unit to perform linear motion. The X axis, the Y axis, the Z axis, and the V axis are each a straight axis. In each of the X-axis drive unit 93X, the V-axis drive unit 93V, the Y-axis drive unit 93Y, and the Z-axis drive unit 93Z, rotary motion of a motor 71 as an actuator is converted, by a feed screw 73, into linear motion in a direction of drive of the corresponding straight axis. The B-axis drive unit 93B and the C-axis drive unit 93C each cause a driven unit to rotate. The B axis and the C axis are each a rotary axis. In each of the B-axis drive unit 93B and the C-axis drive unit 93C, rotary motion of the motor 71 is transmitted to the driven unit using a speed reducer such as a gear. In each of the X-axis drive unit 93X, the V-axis drive unit 93V, the Y-axis drive unit 93Y, and the Z-axis drive unit 93Z, the driven unit caused to perform the linear motion is supported by a linear guide mechanism 72. In each of the B-axis drive unit 93B and the C-axis drive unit 93C, the driven unit caused to perform the rotary motion is supported by a bearing.

In the numerical control machine tool 99a, the straight axes being the X axis, the Y axis, the Z axis, and the V axis are used to achieve motion of the tool 76 in a three-dimensional space of X, Y, and Z, that is, motion of the tool 76 in three degrees of freedom. In the numerical control machine tool 99a, motion of the workpiece 78 in two degrees of freedom is achieved by use of the rotary axes that are the B axis and the C axis. In the numerical control machine tool 99a, as a result, motion in a total of five degrees of freedom is achieved.

Next, drive units included in the numerical control machine tool 99a will be described, the drive units being the X-axis drive unit 93X, the V-axis drive unit 93V, the Y-axis drive unit 93Y, the Z-axis drive unit 93Z, the B-axis drive unit 93B, and the C-axis drive unit 93C. Here, the X-axis drive unit 93X is used as an example to describe a configuration of the drive unit. The V-axis drive unit 93V, the Y-axis drive unit 93Y, and the Z-axis drive unit 93Z each have a configuration similar to that of the X-axis drive unit 93X. The B-axis drive unit 93B and the C-axis drive unit 93C each have a configuration similar to that of the X-axis drive unit 93X except for the difference between linear motion and rotary motion.

Figure 2:
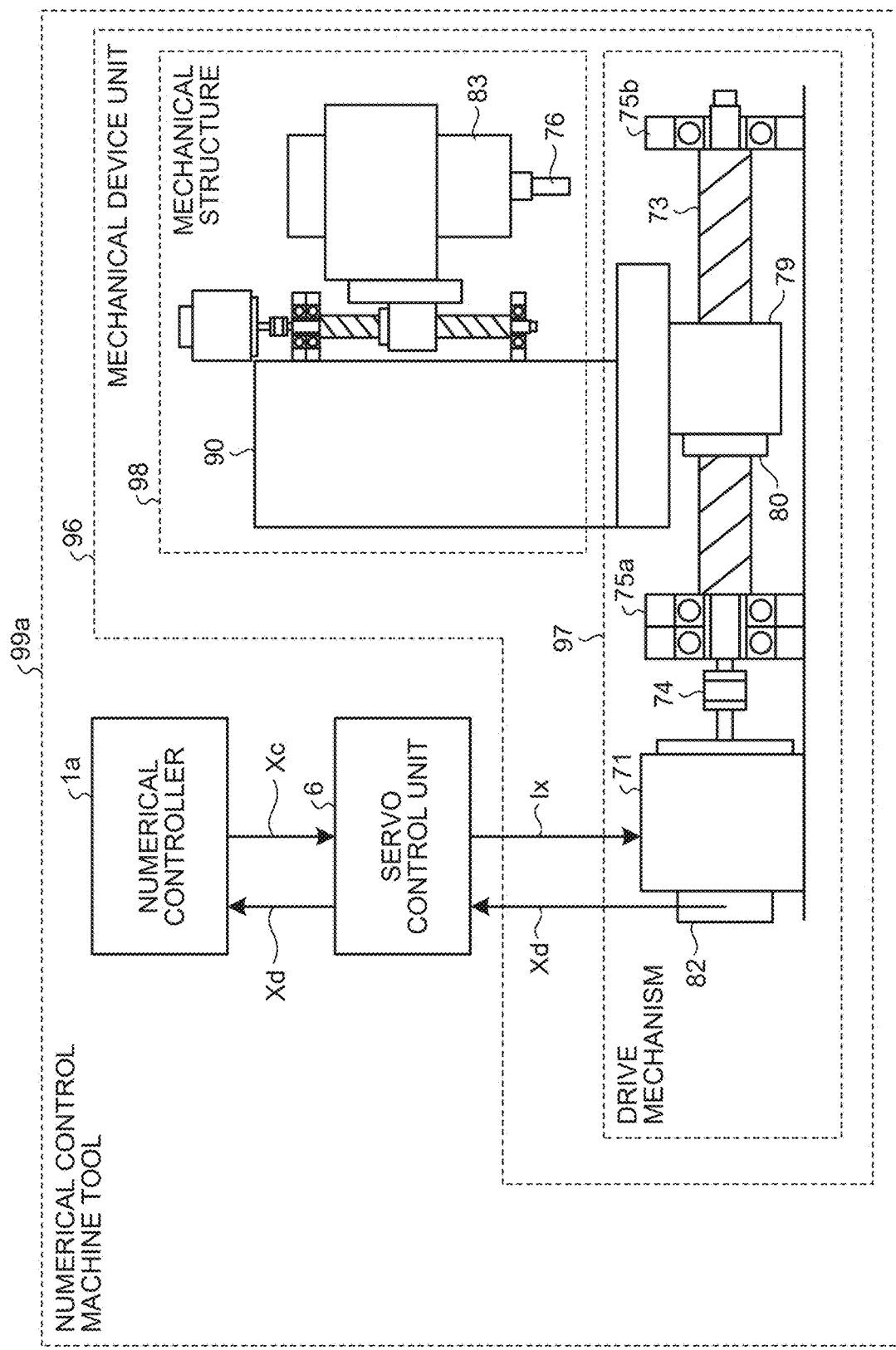
FIG. 2 is a schematic diagram for explaining a configuration of an X-axis drive unit that is an axis drive unit included in the numerical control machine tool according to the first embodiment.

FIG. 2 is a schematic diagram for explaining the configuration of the X-axis drive unit 93X that is the axis drive unit included in the numerical control machine tool 99a according to the first embodiment. As illustrated in FIG. 2, the numerical control machine tool 99a includes a numerical controller 1a that controls the numerical control machine tool 99a, a servo control unit 6, and a mechanical device unit 96. The mechanical device unit 96 includes a drive mechanism 97 and a mechanical structure 98. The servo control unit 6 illustrated in FIG. 2 and the drive mechanism 97 illustrated in FIG. 2 constitute the X-axis drive unit 93X. The mechanical structure 98 is the driven unit that is driven by the X-axis drive unit 93X. The mechanical structure 98 moves by power transmitted from the drive mechanism 97. The numerical control machine tool 99a machines the workpiece 78 using the tool 76 attached to the mechanical structure 98.

The drive mechanism 97 has a role of converting rotary motion of the motor 71 for the X axis into linear motion and a role of supporting a configuration for such conversion. In the X-axis drive unit 93X, the rotary motion of the motor 71 is transmitted to the feed screw 73 via a coupling 74 and converted into the linear motion via a nut 80 and a speed reducer 79. The linear motion of the feed screw 73 is restrained by support bearings 75a and 75b. By the linear motion of the nut 80, the tool 76 is driven in the X direction together with a support 90 supporting the X axis. The support 90 is a generic term for the Z axis interposed between the tool 76 and the nut 80 and the configuration for support. The drive mechanism 97 is provided for each of the plurality of axes.

The V-axis drive unit 93V, the Y-axis drive unit 93Y, and the Z-axis drive unit 93Z as the axis drive units each have the configuration similar to that of the X-axis drive unit 93X. Note that the range of the mechanical structure 98 varies depending on the axis. For example, the drive mechanism 97 for the Z axis does not have a role of converting the motion of the motor 71 for the X axis when viewed from the X axis, and is thus included in the mechanical structure 98 for the X axis. The B-axis drive unit 93B and the C-axis drive unit 93C as the axis drive units each include, instead of the feed screw 73, a worm gear mechanism that decelerates rotary motion. In addition, the B-axis drive unit 93B and the C-axis drive unit 93C each include, instead of the linear guide mechanism 72, the bearing that supports the driven unit performing rotary motion.

The numerical controller 1a controls the mechanical device unit 96. The numerical controller 1a outputs a position command Xc for the X axis to the servo control unit 6. The position command Xc indicates a position obtained by arithmetic operation by the numerical controller 1a in accordance with the machining program, and indicates a position of the driven unit in a desired control state. A position feedback Xd is position data obtained by multiplying the rotation angle of the motor 71, which is detected by a rotation angle detector 82 attached to the motor 71, by the screw pitch of the feed screw 73. The position feedback Xd is input to the numerical controller 1a via the servo control unit 6. The numerical controller 1a performs feedback control of the drive mechanism 97 so as to reduce an error between the position feedback Xd and the position command Xc. The servo control unit 6 outputs a motor current Ix corresponding to the position command Xc to the motor 71, thereby driving the drive mechanism 97. The drive mechanism 97 is connected to the mechanical structure 98 including the tool 76 that is a control target.

The servo control unit 6 performs feedback control to match the position feedback Xd with the position command Xc. However, even if the feedback control is performed, an error may occur between a tip position of the tool 76 and a machining point on the workpiece 78 during machining, which may cause material uncut or excessively cut in the workpiece 78, resulting in a machining error.

Next, a mechanism of occurrence of the machining error in the numerical control machine tool 99a will be described. Here, a case where the rotation angle of the B-axis drive unit 93B is zero degrees, the rotation angle of the C-axis drive unit 93C is zero degrees, and the workpiece 78 is horizontally attached is taken as an example.

Figure 3:
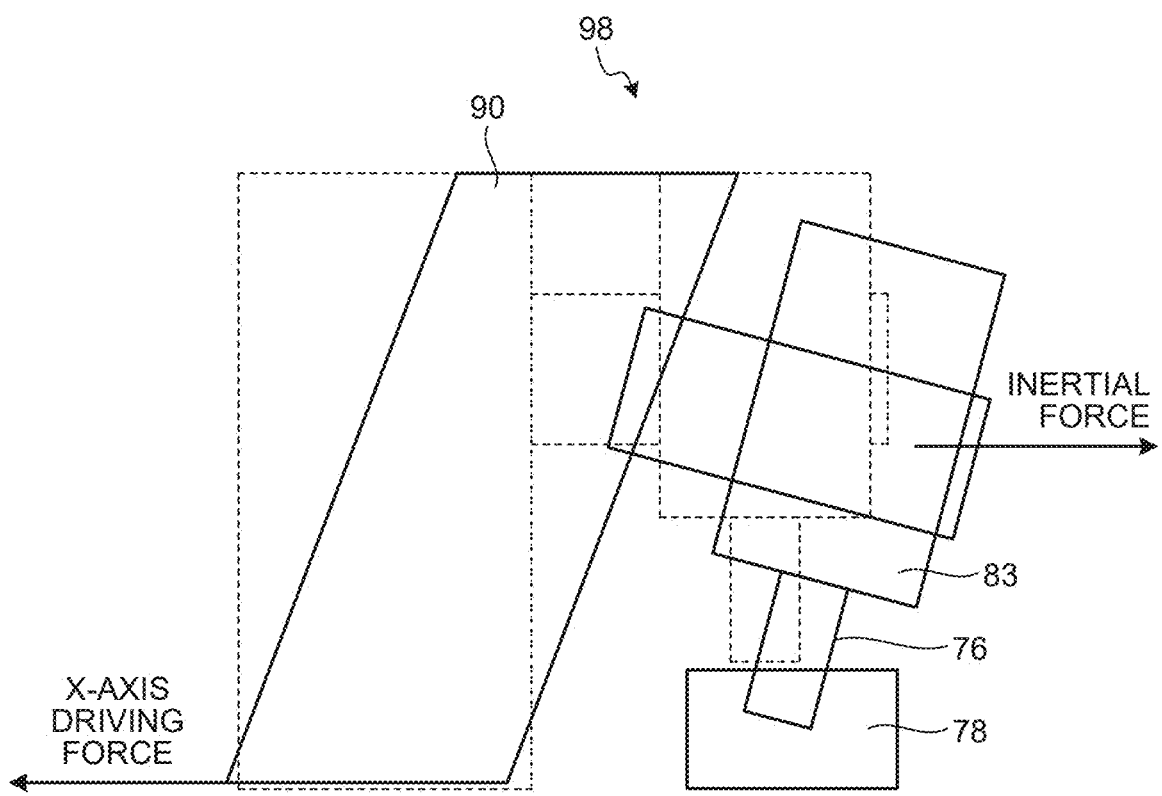
FIG. 3 is a diagram for explaining an example of a mechanism of occurrence of a machining error in the first embodiment.

FIG. 3 is a diagram for explaining an example of the mechanism of occurrence of the machining error in the first embodiment. FIG. 3 illustrates the machining error that is caused by deformation of the support 90 due to motion of the X-axis drive unit 93X and that cannot be handled by feedback control. In FIG. 3, the mechanical structure 98 in an ideal state in which no deformation occurs is indicated by a broken line.

When the X-axis drive unit 93X performs acceleration/deceleration, the driving force of the motor 71 is transmitted to the support 90 via the feed screw 73. In a case where the rigidity of the support 90 is not sufficient, the support 90 is deformed when the driving force of the motor 71 is transmitted to the support 90. This deformation causes the tool 76 to be displaced in the Z direction. The rotation angle detector 82 of the X-axis drive unit 93X can detect an error of the X-axis drive unit 93X occurring in the X direction, but cannot detect an error occurring in the Z direction. Moreover, this deformation occurs outside the Z-axis drive unit 93Z and thus cannot be detected by the rotation angle detector 82 of the Z-axis drive unit 93Z, either.

As a result, such deformation of the support 90 is not detected by the rotation angle detector 82 of any axis, whereby the feedback control does not function for such deformation. The tool 76 bites into the workpiece 78 due to the deformation of the support 90, and the machining error occurs. The tool 76 is in rotary motion and thus cuts away material in a circular shape from the surface of the workpiece 78 when interfering with the workpiece 78. The occurrence of the machining error generates a machining error shape that is a circular machining mark. The machining error shape is a shape generated on the machining surface due to the machining error.

Figure 4:
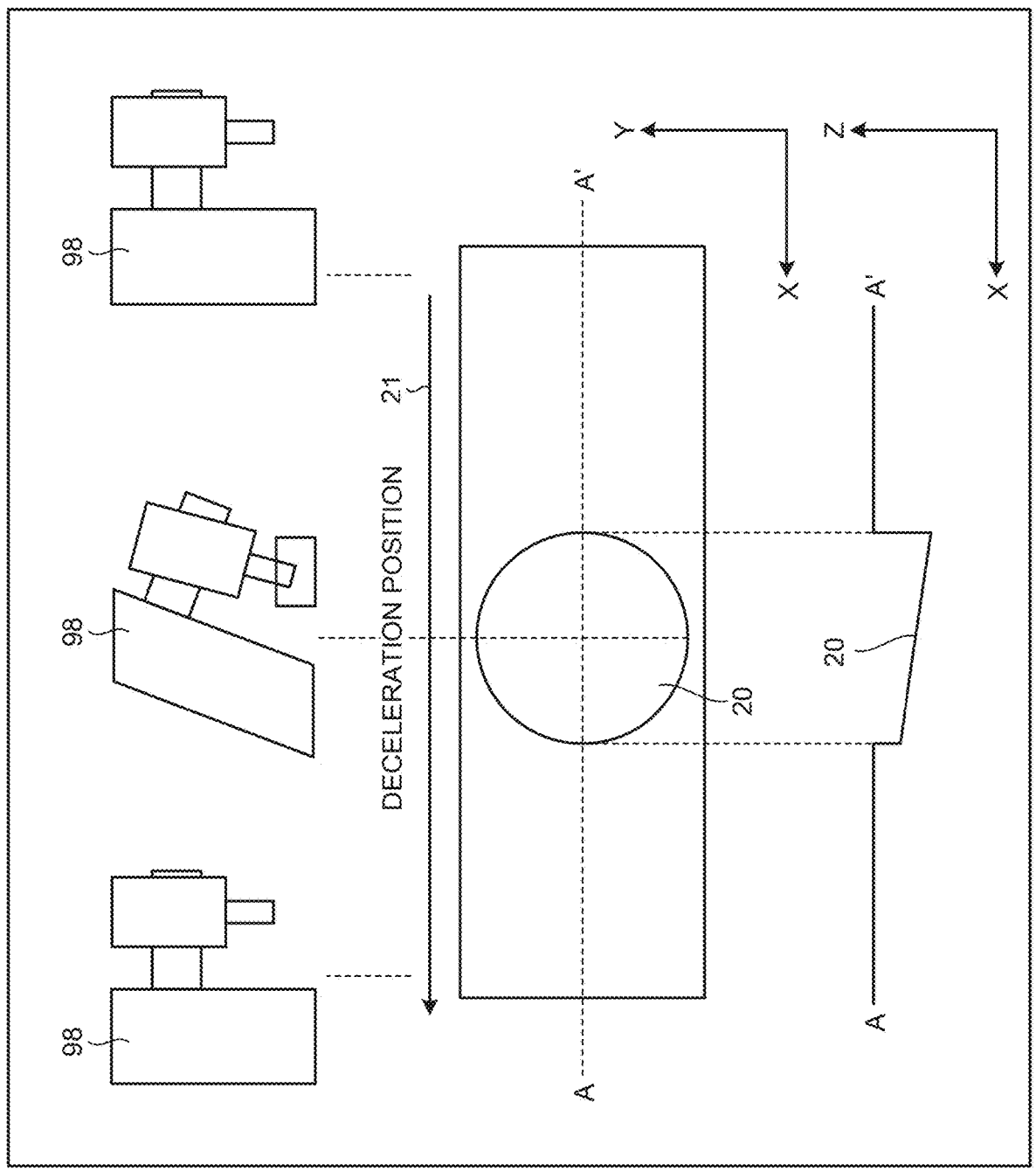
FIG. 4 is a diagram for explaining a first example of a relationship between deformation of a mechanical structure and the machining error in the first embodiment.

FIG. 4 is a diagram for explaining a first example of a relationship between the deformation of the mechanical structure 98 and the machining error in the first embodiment. FIG. 4 illustrates an example of a case where the tool 76 having a cylindrical shape called a straight end mill is used to perform machining while the spindle 83 moves in the X direction. A direction of motion 21 of the tool 76 coincides with the X direction. A machining error shape 20 illustrated in FIG. 4 is an example of the machining error shape that is generated when the X-axis drive unit 93X is decelerated at a deceleration position illustrated in FIG. 4. FIG. 4 illustrates an XY plane shape of the machining error shape 20 when the machining error shape 20 is viewed from the Z direction, and an XZ cross section of the machining error shape 20 when the machining error shape 20 is cut along line A-A'. Moreover, for reference, FIG. 4 schematically illustrates a change in shape of the mechanical structure 98 when the spindle 83 is moved in the X direction.

At the deceleration position, an inertial force accompanying the deceleration of the X-axis drive unit 93X causes the mechanical structure 98 to be deformed so as to be inclined backward in the direction of motion 21. The deformation of the mechanical structure 98 causes the tool 76 to sink into the workpiece 78. As the tool 76 sinks into the workpiece 78, the material on the surface of the workpiece 78 is cut away excessively. As a result, the machining error shape 20 recessed from the periphery is formed at the position where the X-axis drive unit 93X is decelerated. The XY plane shape of the machining error shape 20 is a circle having the same diameter as the outer diameter of the tool 76.

Figure 5:
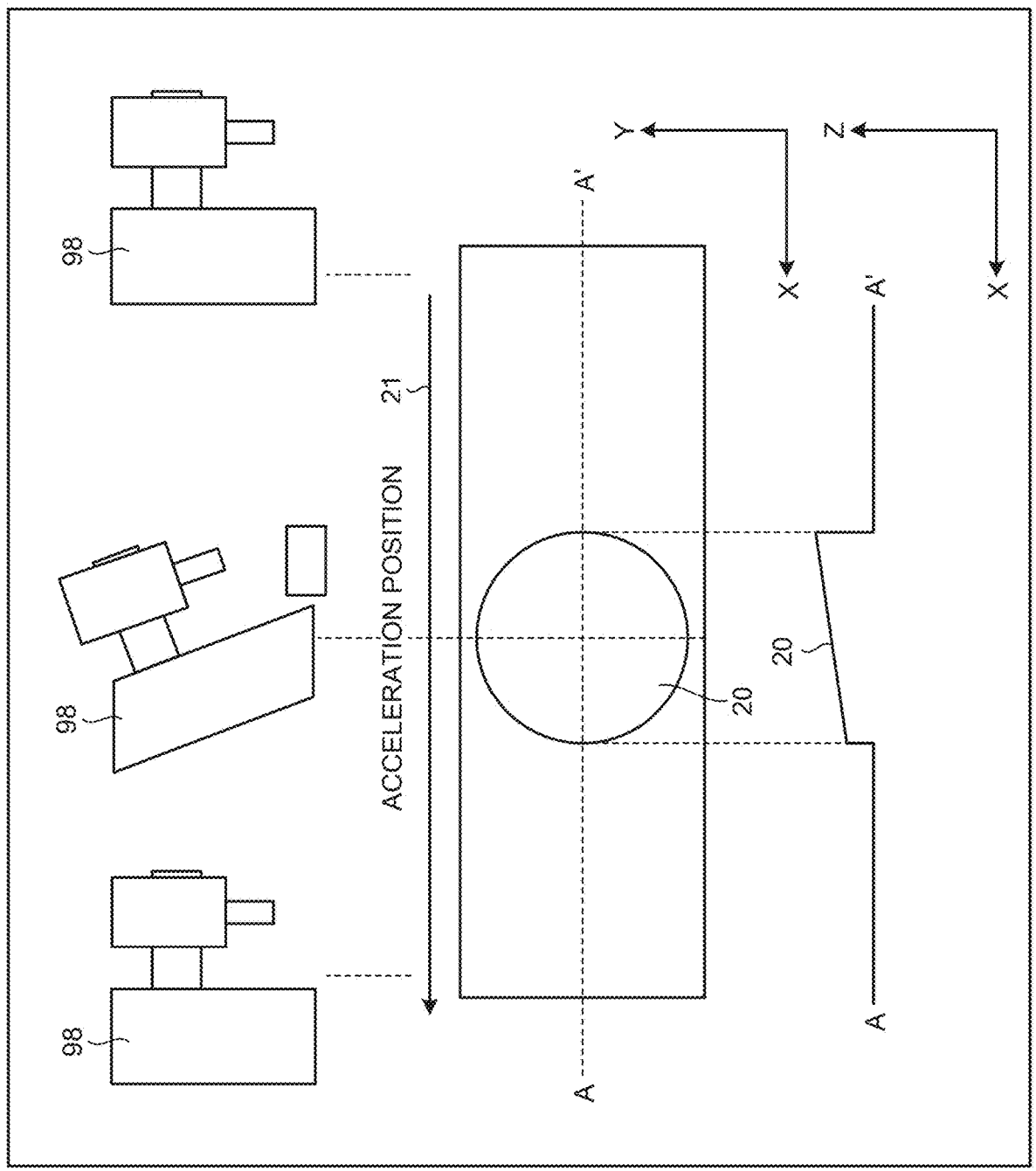
FIG. 5 is a diagram for explaining a second example of the relationship between the deformation of the mechanical structure and the machining error in the first embodiment.

FIG. 5 is a diagram for explaining a second example of the relationship between the deformation of the mechanical structure 98 and the machining error in the first embodiment. As with FIG. 4, FIG. 5 also illustrates an example of the case where the tool 76 being the straight end mill is used to perform machining while the spindle 83 moves in the X direction. The direction of motion 21 of the tool 76 coincides with the X direction. The machining error shape 20 illustrated in FIG. 5 is an example of the machining error shape that is generated when the X-axis drive unit 93X is accelerated at an acceleration position illustrated in FIG. 5. FIG. 5 illustrates an XY plane shape of the machining error shape 20 when the machining error shape 20 is viewed from the Z direction, and an XZ cross section of the machining error shape 20 when the machining error shape 20 is cut along line A-A'. Moreover, for reference, FIG. 5 schematically illustrates a change in posture of the mechanical structure 98 when the spindle 83 is moved in the X direction.

At the acceleration position, an inertial force accompanying the acceleration of the X-axis drive unit 93X causes the mechanical structure 98 to be deformed so as to be inclined forward in the direction of motion 21. The deformation of the mechanical structure 98 causes the tool 76 to be lifted off the workpiece 78. When the tool 76 is lifted off the workpiece 78, the surface of the workpiece 78 is left uncut. As a result, the machining error shape 20 bulging from the periphery is formed at the position where the X-axis drive unit 93X is accelerated. The XY plane shape of the machining error shape 20 is a circle having the same diameter as the outer diameter of the tool 76.

Note that, in FIG. 3 to FIG. 5, the change in shape of the mechanical structure 98 is emphasized for easy understanding of the mechanism of the occurrence of the machining error. The magnitude of the change in shape that occurs in actual machining is, for example, about a hundred micrometers or less in the numerical control machine tool 99a that machines metal, or about several micrometers or less in the numerical control machine tool 99a with high precision, and it is difficult to visually confirm the change in posture of the mechanical structure 98 at the moment of occurrence of the machining error. However, in the case of a metal machining surface, even if the machining error is about several micrometers, light reflection and interference change so that the machining error is perceived as a conspicuous feature on the machining surface to human eyes. Therefore, even when the dimensional accuracy is within a designed tolerance, the quality of the machining surface viewed with human eyes may be determined to be insufficient, and the machining surface may be regarded as having a machining defect. The defective quality of the machining surface results in re-machining, disposal of the workpiece 78 determined to be defective, and the like, which are undesirable. The machining error characterizing the appearance of such a machining surface includes, for example, a stripe pattern generated by vibration of the mechanical structure 98, a streak pattern caused by quadrant glitches due to friction, or the like.

FIG. 3 to FIG. 5 have illustrated examples of the machining error caused by the acceleration/deceleration in the case where the direction of motion 21 coincides with the X direction. In a case where the direction of motion 21 coincides with the Y direction or the direction of motion 21 coincides with the Z direction as well, the machining error due to deformation of the mechanical structure 98 occurs with a mechanism similar to that in the case where the direction of motion 21 coincides with the X direction.

Figure 6:
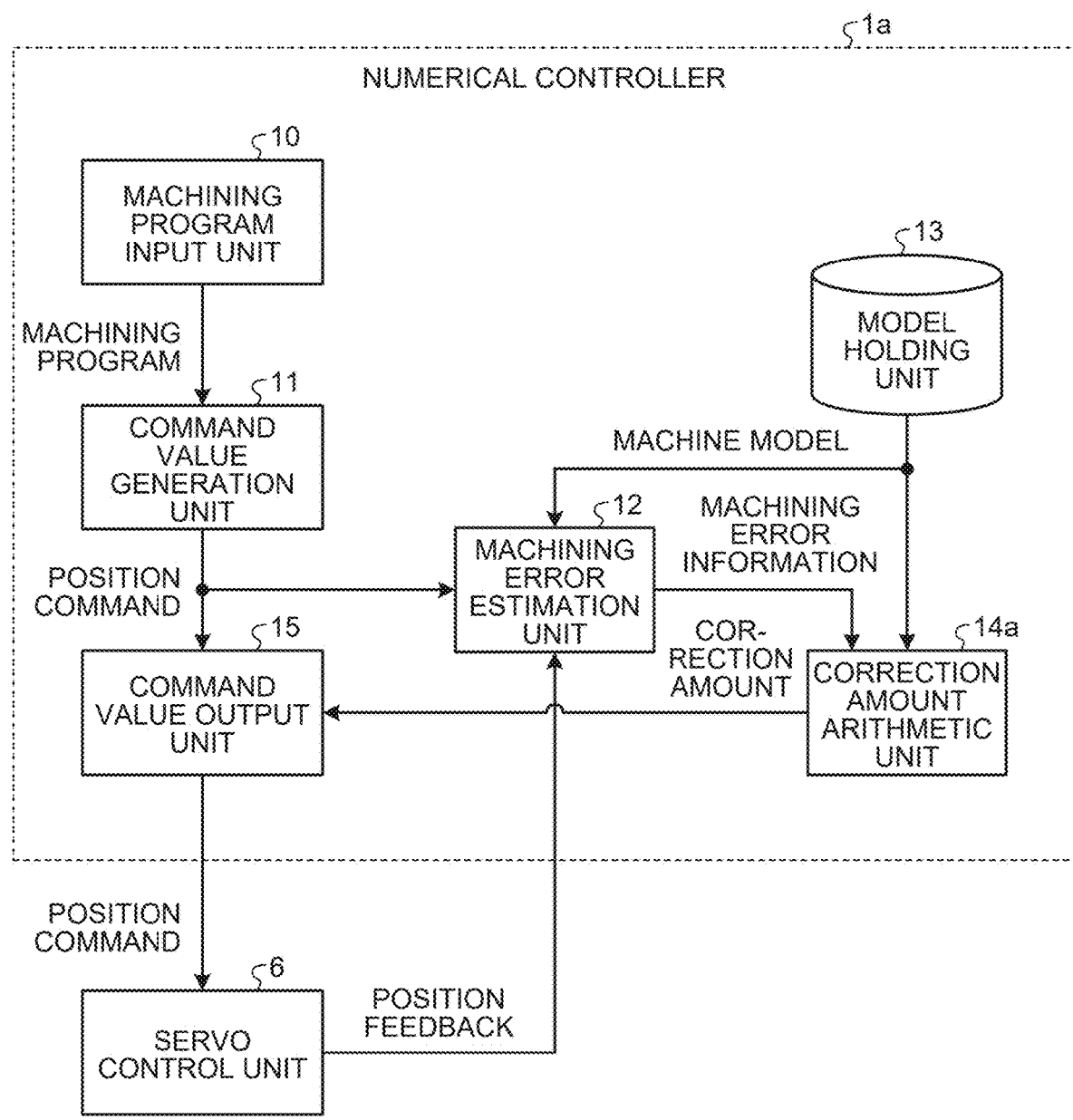
FIG. 6 is a diagram illustrating an exemplary configuration of a numerical controller included in the numerical control machine tool according to the first embodiment.

FIG. 6 is a diagram illustrating an exemplary configuration of the numerical controller 1a included in the numerical control machine tool 99a according to the first embodiment. FIG. 6 illustrates the numerical controller 1a and the servo control unit 6. The numerical controller 1a receives input of the machining program created by computer aided manufacturing (CAM) software, an interactive program creation device, or the like. The numerical controller 1a includes a machining program input unit 10 that receives the machining program, a command value generation unit 11 that generates a command value as a position command for each axis, a machining error estimation unit 12 that estimates the machining error, a model holding unit 13 that holds a machine model, a correction amount arithmetic unit 14a that performs arithmetic to find a correction amount, and a command value output unit 15 that outputs the command value as the position command for each axis.

The machining program input unit 10 outputs the machining program received to the command value generation unit 11. The command value generation unit 11 calculates the position command for each axis on the basis of the machining program. The command value generation unit 11 outputs the position command for each axis to each of the machining error estimation unit 12 and the command value output unit 15.

The machine model is a model that simulates the deformation of the mechanical structure 98 accompanying the motion of the mechanical structure 98 in each axial direction, which is the direction of each of the plurality of axes, and represents an error amount that is an amount of displacement of the tool 76 in each axial direction due to the deformation of the mechanical structure 98. The machining error estimation unit 12 reads the machine model from the model holding unit 13. The servo control unit 6 outputs the position feedback for each axis to the machining error estimation unit 12. On the basis of axis data and the machine model, the machining error estimation unit 12 estimates an error direction, which is a direction in which displacement of the tool 76 occurs among the axial directions, and the error amount in the error direction, thereby outputting machining error information indicating the error direction estimated and the error amount estimated. The axis data is data on the driving of the drive mechanism 97. The axis data is data on one or more values among a velocity command for each axis, an acceleration command for each axis, and a velocity or acceleration as a state quantity of the drive mechanism 97 for each axis. The machining error estimation unit 12 outputs the machining error information to the correction amount arithmetic unit 14a.

The correction amount arithmetic unit 14a reads the machine model from the model holding unit 13. The correction amount arithmetic unit 14a selects one or more of the axes subject to correction on the basis of the machining error information and the machine model. The correction amount arithmetic unit 14a performs arithmetic to find the correction amount that is used to correct the command output to the drive mechanism 97 for the selected axis. The correction amount arithmetic unit 14a outputs information on the correction amount for the selected axis to the command value output unit 15. The command value output unit 15 corrects the position command for the selected axis on the basis of the correction amount. The command value output unit 15 outputs the corrected position command for the selected axis to the servo control unit 6.

Figure 7:
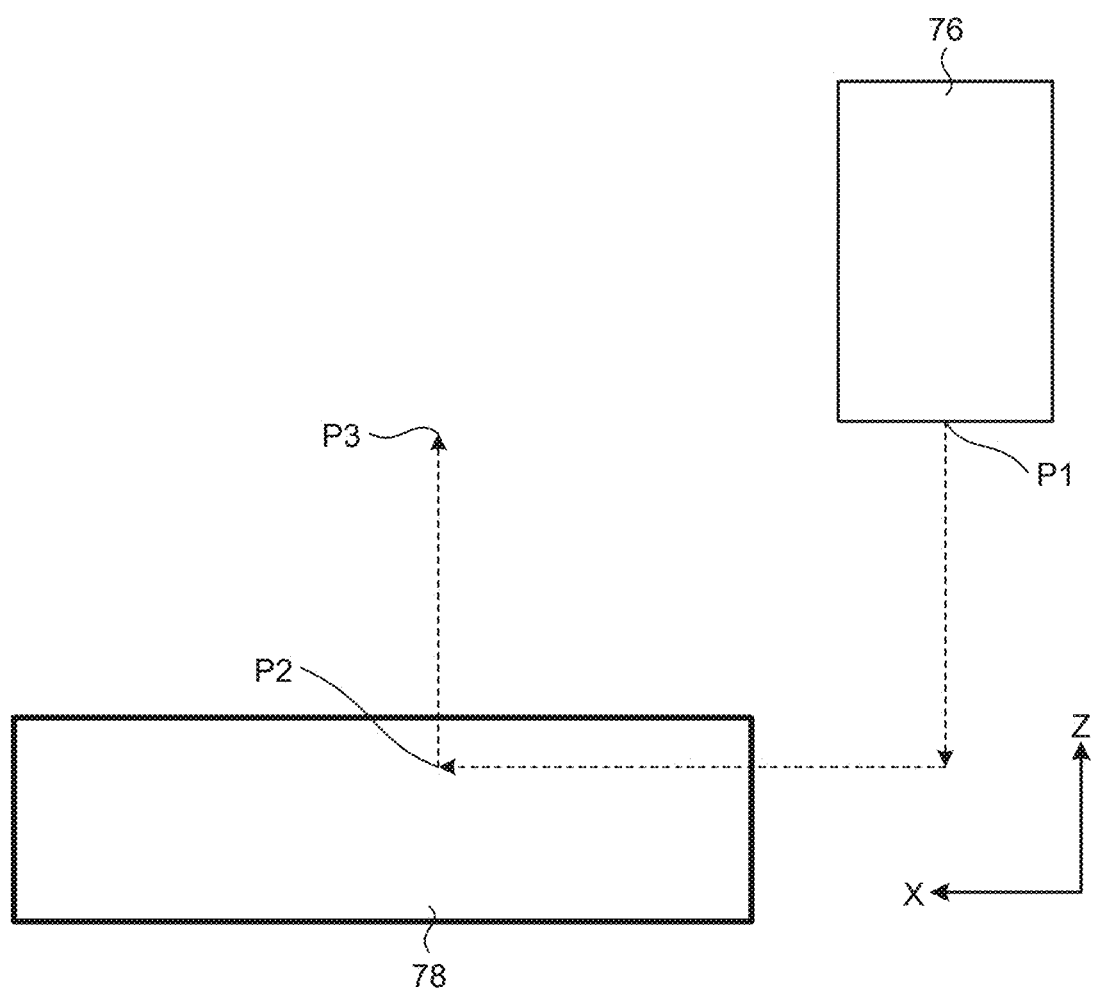
FIG. 7 is a diagram for explaining an example of machining by the numerical control machine tool according to the first embodiment.

Next, an example of machining by the numerical control machine tool 99a and an example of the machine model will be described. FIG. 7 is a diagram for explaining the example of machining by the numerical control machine tool 99a according to the first embodiment. FIG. 7 schematically illustrates how machining is performed in a case where a simple linear machining path is described in the machining program. A broken arrow illustrated in FIG. 7 indicates a locus of a tip portion of the tool 76. FIG. 7 illustrates a solid arrow indicating the X direction and a solid arrow indicating the Z direction. A direction in which the solid arrow indicating the Z direction points is referred to as a positive Z direction, and a direction opposite to the positive Z direction is referred to as a negative Z direction. A direction in which the solid arrow indicating the X direction points is referred to as a positive X direction, and a direction opposite to the positive X direction is referred to as a negative X direction.

The numerical control machine tool 99a starts the rotation of the tool 76 at a position P1 that is a program start position. The numerical control machine tool 99a moves the tool 76 in the negative Z direction by driving the Z-axis drive unit 93Z. As a result, the numerical control machine tool 99a moves the tool 76 to the machining surface that is an upper surface of the workpiece 78. The numerical control machine tool 99a moves the tool 76 in the positive X direction on the machining surface by driving the X-axis drive unit 93X. When moving the tool 76 in the positive X direction, the numerical control machine tool 99a accelerates the X-axis drive unit 93X and then decelerates the X-axis drive unit 93X.

When the tool 76 reaches a position P2, the numerical control machine tool 99a stops the X-axis drive unit 93X. The numerical control machine tool 99a moves the tool 76 in the positive Z direction by driving the Z-axis drive unit 93Z. As a result, the numerical control machine tool 99a separates the tool 76 from the machining surface. The numerical control machine tool 99a stops the rotation of the tool 76 at a position P3 that is a program end position, and ends the machining of the workpiece 78. In the case of the machining illustrated in FIG. 7, deformation of the mechanical structure 98 occurs at a position where the X-axis drive unit 93X is decelerated.

Figure 8:
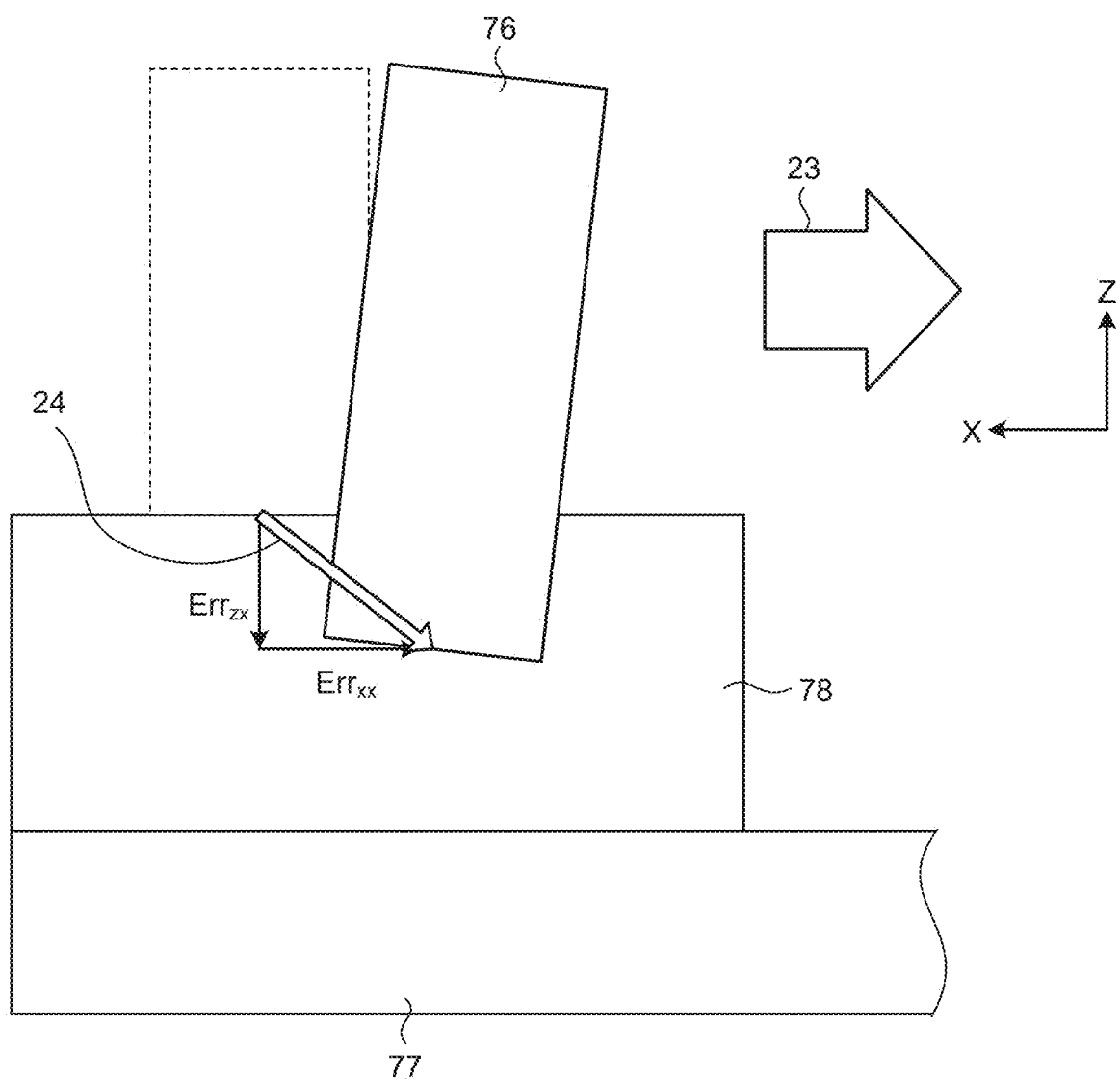
FIG. 8 is a diagram for explaining exemplary calculation of the machining error by a machining error estimation unit included in the numerical controller illustrated in FIG. 6.

FIG. 8 is a diagram for explaining exemplary calculation of the machining error by the machining error estimation unit 12 included in the numerical controller 1a illustrated in FIG. 6. FIG. 8 schematically illustrates how the machining error occurs by the deceleration of the X-axis drive unit 93X in the machining illustrated in FIG. 7. At the deceleration position, the mechanical structure 98 as the driven unit of the X-axis drive unit 93X is deformed so as to be inclined backward in the direction of motion by the inertial force accompanying the deceleration of the X-axis drive unit 93X. An arrow 23 illustrated in FIG. 8 indicates the direction of the inertial force acting on the mechanical structure 98 when the mechanical structure 98 moves in the positive X direction. The deformation of the mechanical structure 98 causes the tool 76 to bite into the workpiece 78 excessively. When the tool 76 bites into the workpiece 78, the numerical control machine tool 99a experiences the machining error of excessively cutting the workpiece 78. In FIG. 8, the tool 76 in an ideal state in which the mechanical structure 98 is not deformed is indicated by a broken line.

The amount of deformation of the mechanical structure 98 in the axial directions, which are directions of the X axis, the Y axis, and the Z axis as straight axes, is obtained by substituting the axis data of the drive mechanism 97 for the X axis into the machine model. The machine model for calculating the error amounts in the axial directions caused by the driving of the X-axis drive unit 93X can be described by transfer functions as expressed by the following Formulas (1), (2), and (3).

Formula 1

$$Err_{xx}(s) = K_{xx} \frac{s^2 + 2\zeta_{x1}\omega_{x1}s + \omega_{x1}^2}{s^2 + 2\zeta_{x2}\omega_{x2}s + \omega_{x2}^2} \left( \hat{X}_{rx}(s) - \hat{X}_{fx}(s) \right) \quad (1)$$

Formula 2:

$$\text{Err}_{yx}(s) = 0 \quad (2)$$

Formula 3

$$\text{Err}_{zx}(s) = K_{xz} \frac{s^2 + 2\zeta_{x1}\omega_{x1}s + \omega_{x1}^2}{s^2 + 2\zeta_{x2}\omega_{x2}s + \omega_{x2}^2}\left(\hat{\dot{X}}_{rx}(s) - \hat{\dot{X}}_{fx}(s)\right) \quad (3)$$

Formulas (1), (2), and (3) are each the machine model that simulates the deformation of the mechanical structure 98 accompanying the motion of the mechanical structure 98 in the X direction. In Formula (1), "Err$_{xx}$(s)" represents the amount of displacement of the tool 76 in the X direction due to the deformation of the mechanical structure 98, that is, the error amount in the X direction due to the deformation of the mechanical structure 98. In Formula (2), "Err$_{yx}$(s)" represents the amount of displacement of the tool 76 in the Y direction due to the deformation of the mechanical structure 98, that is, the error amount in the Y direction due to the deformation of the mechanical structure 98. In Formula (3), "Err$_{zx}$(s)" represents the amount of displacement of the tool 76 in the Z direction due to the deformation of the mechanical structure 98, that is, the error amount in the Z direction due to the deformation of the mechanical structure 98. Here, "s" represents a Laplace operator.

A term with a dot symbol "•" at the top of "X$_{rx}$(s)" represents a Laplace transform of the velocity command. The velocity command is expressed by a derivative of the position command. A term with a dot symbol "•" at the top of "X$_{fx}$(s)" represents a Laplace transform of velocity feedback. The velocity feedback is data of the velocity that is the state quantity of the drive mechanism 97. The velocity feedback is expressed by a derivative of the position feedback. "K$_{xx}$" and "K$_{xz}$" are coefficients for describing the amount of deformation of the mechanical structure 98. "ω$_{x1}$" and "ω$_{x2}$" represent frequencies for describing the deformation of the mechanical structure 98. "ζ$_{x1}$" and "ζ$_{x2}$" are damping coefficients for describing the deformation of the mechanical structure 98. In the numerical control machine tool 99a, the error amount in the Y direction is not generated when the X-axis drive unit 93X is driven. Therefore, as expressed by Formula (2), "Err$_{yx}$(s)" is "0" regardless of the axis data of the drive mechanism 97 for the X axis. In each of Formulas (1) and (3), the velocity command and the velocity feedback that are the axis data for the X axis are included as variables.

In each of the machine models expressed by Formulas (1), (2), and (3), the error amount is described in the frequency domain by the Laplace transform. The error amount can be converted into the time domain using a known method such as an inverse Laplace transform. In the following description, the machining error refers to a phenomenon due to displacement of the tool 76 in the time domain. "Err$_{xx}$" represents the error amount in the X direction when the mechanical structure 98 moves in the X direction. "Err$_{yx}$" represents the error amount in the Y direction when the mechanical structure 98 moves in the X direction. "Err$_{zx}$" represents the error amount in the Z direction when the mechanical structure 98 moves in the X direction. An arrow 24 illustrated in FIG. 8 indicates the error amount as a sum of "Err$_{xx}$", "Err$_{yx}$", and "Err$_{zx}$".

Note that the machine models expressed by Formulas (1), (2), and (3) are examples. The machine model is not limited to those expressed by Formulas (1), (2), and (3). The machine model may use a state space model instead of the transfer function. The machine model may be described by a function in the time domain. In the machine model, the acceleration command may be used instead of the velocity command, and the acceleration feedback may be used instead of the velocity feedback. The acceleration feedback is data of the acceleration that is the state quantity of the drive mechanism 97. Also, in the machine model, a difference between the acceleration command and the acceleration feedback may be used instead of the difference between the velocity command and the velocity feedback. For the data of the velocity as the state quantity, a result of detection of the velocity by each of a plurality of the servo control units 6 included in the numerical control machine tool 99a or a result of detection of the velocity by each of a plurality of sensors may be used. For the data of the acceleration as the state quantity, a result of detection of the acceleration by each of the plurality of the servo control units 6 included in the numerical control machine tool 99a or a result of detection of the acceleration by each of the plurality of the sensors may be used.

"K$_{xx}$" and "K$_{xz}$" are arbitrary real numbers. "ω$_{x1}$", "ω$_{x2}$", "ζ$_{x1}$", and "ζ$_{x2}$" are arbitrary positive real numbers. The error amount is an arbitrary positive real number. In Formulas (1) and (3), the frequencies ω$_{x1}$ and ω$_{x2}$ common in the axial directions are used as frequencies for describing the amount of deformation of the single mechanical structure 98. In Formulas (1) and (3), the damping coefficients ζ$_{x1}$ and ζ$_{x2}$ common in the axial directions are used as damping coefficients for describing the amount of deformation of the single mechanical structure 98. The machine model may use a different frequency for each axial direction and a different damping coefficient for each axial direction.

Each of "Err$_{xx}$", "Err$_{yx}$", and "Err$_{zx}$" takes a positive value in the case of the machining error in which the tool 76 is displaced in the positive X direction with respect to an ideal tool position. Each of "Err$_{xx}$", "Err$_{yx}$", and "Err$_{zx}$" takes a negative value in the case of the machining error in which the tool 76 is displaced in the negative X direction with respect to the ideal tool position. For example, when "Err$_{zx}$" takes a positive value, the tool 76 is lifted off the workpiece 78. When "Err$_{zx}$" takes a negative value, the tool 76 sinks into the workpiece 78.

Formulas (1) and (3) illustrate examples of the machine model including the axis data for the X axis as the variables. As the machine model, a machine model including the axis data on an axis other than the X axis as the variables is also set, the axis other than the X axis being the Y axis, the Z axis, the B axis, or the C axis. As with the machine model including the axis data on the X axis as the variables, the machine model including the axis data on the Y axis, the Z axis, the B axis, or the C axis as the variables also includes a machine model representing the error amount in each of the X direction, the Y direction, and the Z direction. That is, in the numerical control machine tool 99a, a machine model that simulates the deformation of the mechanical structure 98 accompanying the motion of the mechanical structure 98 in the axial directions, which are the directions of the X axis, the Y axis, the Z axis, the B axis, and the C axis, and represents the error amount in each of the X direction, the Y direction, and the Z direction due to the deformation of the mechanical structure 98 is set. The set machine model is stored in the model holding unit 13. Note that in the numerical control machine tool 99a, only the machine model for the axial direction having a significant error may be set. In the numerical control machine tool 99a, only the machine model representing the error amount with respect to the motion of the mechanical structure 98 in the directions of the X axis, the Y axis, and the Z axis, which are the straight axes, may be set.

Figure 9:
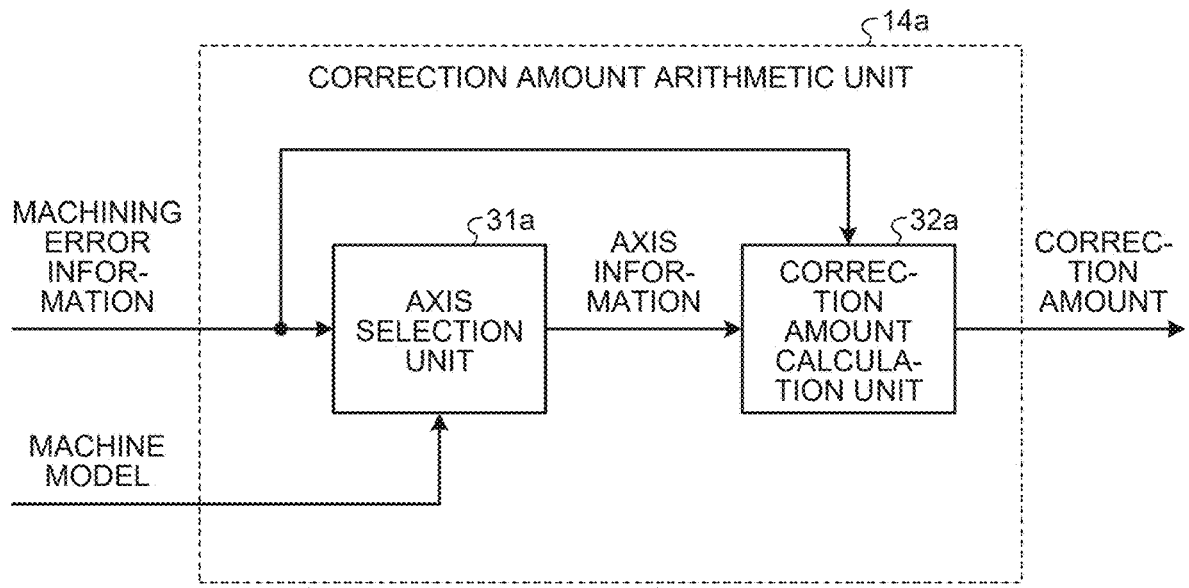
FIG. 9 is a diagram illustrating an exemplary configuration of a correction amount arithmetic unit included in the numerical controller illustrated in FIG. 6.

FIG. 9 is a diagram illustrating an exemplary configuration of the correction amount arithmetic unit 14a included in the numerical controller 1a illustrated in FIG. 6. The machining error estimation unit 12 outputs, to the correction amount arithmetic unit 14a, the machining error information indicating the error direction in which the tool 76 is displaced and the error amount in the error direction. The correction amount arithmetic unit 14a reads the machine model from the model holding unit 13. The correction amount arithmetic unit 14a includes an axis selection unit 31a that selects one or more of the axes subject to correction, and a correction amount calculation unit 32a that calculates the correction amount.

The axis selection unit 31a selects the axis subject to correction on the basis of the machining error information and the machine model. For example, in the case where the machining error occurs as illustrated in FIG. 8, the error directions are the X direction and the Z direction. In this case, the machining error information indicating the X direction and the Z direction, which are the error directions, and "$Err_{xx}$" and "$Err_{zx}$", which are the error amounts in the error directions, is input to the axis selection unit 31a. The axis selection unit 31a recognizes, on the basis of the machine model, that the machining error information that has been input is the machining error information resulting from the driving of the X-axis drive unit 93X.

In the example illustrated in FIG. 8, of the error amounts represented by the arrow 24, "$Err_{xx}$" is an error amount component in a direction included in the machining surface. Of the error amounts represented by the arrow 24, "$Err_{xx}$" is an error amount component in a direction perpendicular to the machining surface. Of "$Err_{xx}$" and "$Err_{zx}$", "$Err_{xx}$" does not cause excessive cutting in the direction perpendicular to the machining surface or leaving an uncut portion in the direction perpendicular to the machining surface. With the use of the tool 76 having a certain radius, in a case where acceleration/deceleration is performed for a distance within the radius of the tool 76, even if the error amount component in the direction included in the machining surface causes leaving the uncut portion, the uncut portion is cut away when the front and back of the uncut portion are machined. Therefore, leaving the uncut portion due to the error amount component in the direction included in the machining surface does not result in a machining defect. Moreover, excessive cutting, when occurring in the direction included in the machining surface, does not result in a machining defect. On the other hand, a machining error due to the error amount component in the direction perpendicular to the machining surface causes leaving an uncut portion in the direction perpendicular to the machining surface or excessive cutting in the direction perpendicular to the machining surface, and remains as a machining defect. Thus, the axis selection unit 31a selects the Z direction as the axis subject to correction between the X direction and the Z direction that are the error directions indicated in the machining error information.

As described above, the axis selection unit 31a selects the axis subject to correction on the basis of the machine model and the machining error information for the axial directions. The axis selection unit 31a outputs axis information indicating the selected axis to the correction amount calculation unit 32a.

The correction amount calculation unit 32a receives input of the machining error information and the axis information.

The correction amount calculation unit 32a calculates the correction amount for each axis indicated in the axis information on the basis of the machining error information. In the case of the example illustrated in FIG. 8, the correction amount calculation unit 32a calculates, on the basis of the axis information indicating the Z direction and the machining error information, the correction amount for reducing the machining error in the Z direction due to the driving of the X-axis drive unit 93X. That is, the correction amount calculation unit 32a calculates a correction amount $Z_{rc}$ for correcting the motion of the driven unit associated with the Z-axis drive unit 93Z. For example, as exemplary calculation of the correction amount, in order to offset "$Err_{zx}$" by operating the driven unit in a direction opposite to that of "$Err_{zx}$" as the error amount component in the Z direction, "$-Err_{zx}$" is set as the correction amount. The correction amount calculation unit 32a calculates, for the axis selected as the subject of correction, the correction amount that can cancel the error amount estimated by the machining error estimation unit 12.

The correction may be delayed by a delay due to arithmetic processing of obtaining the correction amount, a delay due to communication, a response delay of the servo control unit 6 of the Z-axis drive unit 93Z, or the like. Alternatively, a correction amount different from the correction amount that can offset the error amount may be calculated. When a transfer function from the input of the position command to the servo control unit 6 of the Z-axis drive unit 93Z up to the response of the Z-axis drive unit 93Z is set as "$G_{zm}(s)$", the correction amount calculation unit 32a may use "$G_{zm}-1$", which is an inverse transfer function of a control system, to output "$-Err_{zx}G_{zm}^{-1}$" that is a correction amount capable of compensating for characteristics of the control system. The correction amount calculation unit 32a outputs information on the correction amount obtained to the command value output unit 15. The command value output unit 15 corrects the position command for the selected axis on the basis of the correction amount.

Figure 10:
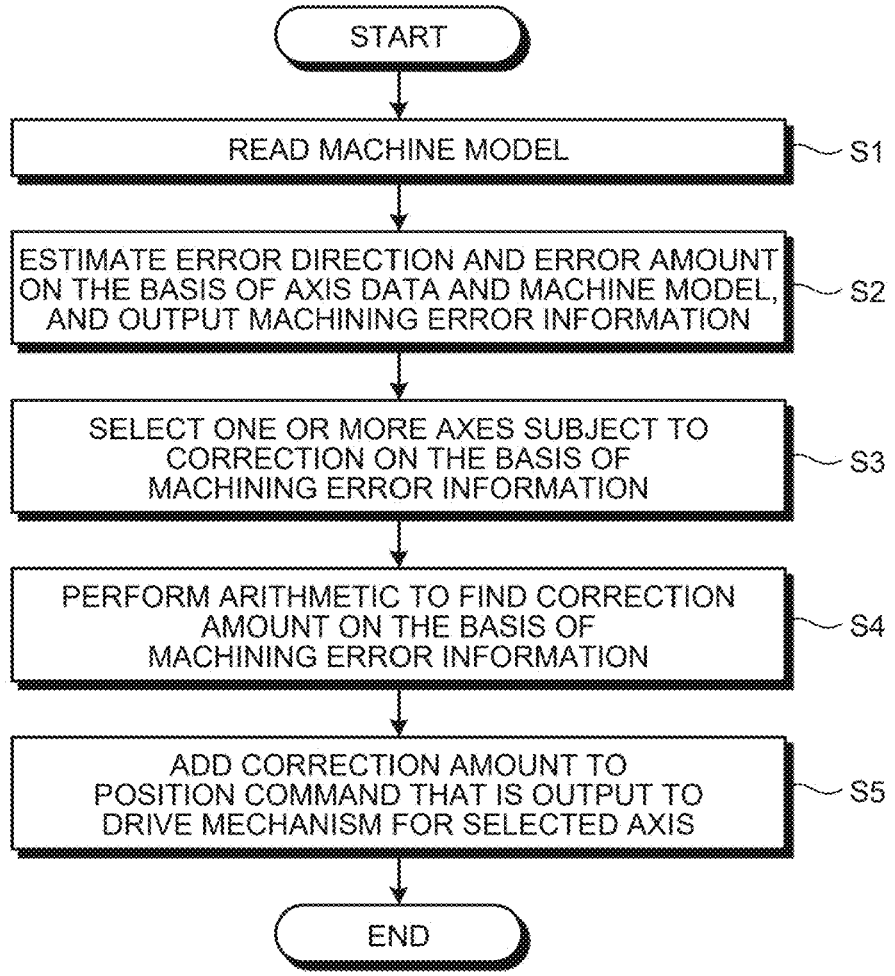
FIG. 10 is a flowchart illustrating a procedure of operation of the numerical controller included in the numerical control machine tool according to the first embodiment.

Next, a procedure of operation of the numerical controller 1a will be described. FIG. 10 is a flowchart illustrating the procedure of operation of the numerical controller 1a included in the numerical control machine tool 99a according to the first embodiment.

In step S1, the machining error estimation unit 12 of the numerical controller 1a reads the machine model from the model holding unit 13. In step S2, the machining error estimation unit 12 estimates the error direction and the error amount on the basis of the axis data and the machine model, and outputs the machining error information. The machining error estimation unit 12 estimates the error direction, which is the direction in which the tool 76 is displaced among the axial directions, and the error amount in the error direction. The machining error estimation unit 12 outputs the machining error information indicating the error direction estimated and the error amount estimated.

In step S3, the correction amount arithmetic unit 14a of the numerical controller 1a uses the axis selection unit 31a to select one or more of the axes subject to correction on the basis of the machining error information. In step S4, the correction amount arithmetic unit 14a uses the correction amount calculation unit 32a to calculate the correction amount on the basis of the machining error information. The correction amount calculation unit 32a outputs the information on the correction amount obtained to the command value output unit 15.

In step S5, the command value output unit 15 adds the correction amount to the position command that is output to the drive mechanism 97 for the selected axis. The command value output unit 15 corrects the position command by adding the correction amount to the position command. The command value output unit 15 outputs the corrected position command to the servo control unit 6. The numerical controller 1a thus ends the operation according to the procedure illustrated in FIG. 10.

According to the first embodiment, the numerical controller 1a estimates the error direction and the error amount on the basis of the axis data and the machine model, and performs arithmetic to obtain the correction amount. In a case where the machining error due to the deformation of the mechanical structure 98 occurs by acceleration/deceleration of the axis drive units for the axes, the numerical controller 1a can correct only the machining error in the axial direction that affects machining. The numerical controller 1a does not correct the machining error in the axial direction that does not affect machining, thereby being able to reduce a decrease in the machining accuracy that is a concern when unnecessary correction is made. As described above, the numerical controller 1a and the numerical control machine tool 99a achieve an effect of being able to reduce the machining error caused by the deformation of the mechanical structure 98.

Second Embodiment

A second embodiment will describe an example of performing simple approximation calculation to calculate a correction amount that can correct a machining error with high accuracy. The configuration of the numerical control machine tool 99a according to the second embodiment is similar to the configuration of the numerical control machine tool 99a according to the first embodiment. In the second embodiment, components identical to those in the above first embodiment are denoted by the same reference numerals as those assigned to such components in the first embodiment, and a configuration different from that of the first embodiment will be mainly described.

In the first embodiment, for the axis selected as the subject of correction, the correction amount arithmetic unit 14a outputs the correction amount that can cancel the error amount estimated on the basis of the machine model. However, due to the delay of the control system, it may be difficult to sufficiently correct the machining error with the calculated correction amount. In a case where the inverse transfer function that compensates for the characteristics of the control system is used for the arithmetic operation of the correction amount, the accuracy of correction may be affected by low modeling accuracy of the transfer function. In a case where the inverse transfer function has a differential term, the correction amount may be fluctuating.

In the correction of the machining error, it is important that the motion for correction is started without delay at the timing when the machining error actually occurs. Excess cutting due to sinking of the tool 76 into the machining surface cannot be corrected when occurring even once. On the other hand, in a case where an uncut portion is left due to lifting of the tool 76 off the machining surface, the uncut portion can be removed by setting the tool position to an appropriate position while the tool 76 is passing over the uncut portion, so that there is room for recovery from the machining defect. As described above, the delay in the correction timing is not tolerated for excessive cutting, whereas for the uncut portion, the occurrence of a machining error can be avoided even when the uncut portion is left to some extent.

Figure 11:
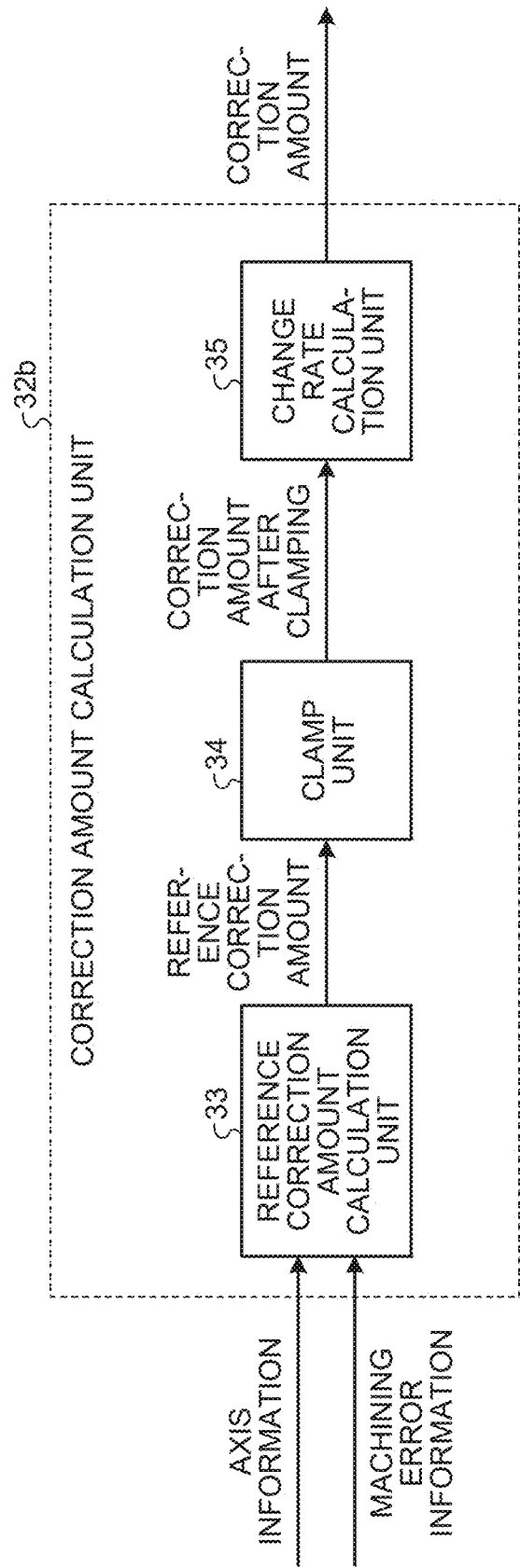
FIG. 11 is a diagram illustrating an exemplary configuration of a correction amount calculation unit included in a correction amount arithmetic unit of a numerical controller according to a second embodiment.

FIG. 11 is a diagram illustrating an exemplary configuration of a correction amount calculation unit 32b included in the correction amount arithmetic unit 14a of the numerical controller 1a according to the second embodiment. In the second embodiment, the correction amount arithmetic unit 14a includes the correction amount calculation unit 32b different from the correction amount calculation unit 32a illustrated in FIG. 9.

The correction amount calculation unit 32b sets the correction amount larger than the error amount that is expected to occur in practice, thereby causing an uncut portion that is allowable to be left. That is, the correction amount calculation unit 32b performs arithmetic to obtain the correction amount that prevents excessive cutting due to the motion for correction from occurring at all and enables machining an uncut portion by the motion before and after correction even when the uncut portion is left due to the motion for correction.

The correction amount calculation unit 32b includes a reference correction amount calculation unit 33, a clamp unit 34, and a change rate calculation unit 35. The reference correction amount calculation unit 33 calculates a reference correction amount as a reference value of the correction amount on the basis of the axis information and the machining error information for each axial direction. When "$\text{Err}_{zx}$" being the error amount in the Z direction due to the driving of the X-axis drive unit 93X is taken as an example, the reference correction amount is "$-\alpha \text{Err}_{zx}$". Here, "$\alpha$" is an arbitrary real number. The reference correction amount calculation unit 33 finds "$-\alpha \text{Err}_{zx}$" by multiplying "$-\text{Err}_{zx}$", which is obtained by adding a minus sign to "$\text{Err}_{zx}$", by "$\alpha$". The value of "$\alpha$" is determined by performing machining while actually making correction and measuring the shape after machining, and searching for a condition under which no uncut portion is left. The reference correction amount calculation unit 33 outputs information on the reference correction amount to the clamp unit 34.

The clamp unit 34 performs clamp processing on the reference correction amount exceeding "$Z_{rlim+}$", which is an upper limit value of the correction amount, with the upper limit value $Z_{rlim+}$. Alternatively, the clamp unit 34 performs clamp processing on the reference correction amount falling below "$Z_{rlim-}$", which is a lower limit value of the correction amount, with the lower limit value $Z_{rlim-}$. An absolute value of the upper limit value and an absolute value of the lower limit value may be the same or different from each other. The clamp unit 34 is not limited to one in which both the upper limit value and the lower limit value are set. Only one of the upper limit value and the lower limit value may be set in the clamp unit 34. As the upper limit value, a maximum value of "$-\text{Err}_{zx}$" may be set. As the lower limit value, a minimum value of "$-\text{Err}_{zx}$" may be set. The correction amount with which a machining error does not occur may be obtained experimentally, and the upper limit value and the lower limit value may be set on the basis of the correction amount obtained. The clamp unit 34 outputs information of the correction amount after clamping to the change rate calculation unit 35.

The correction amount arithmetic unit 14a includes the correction amount calculation unit 32b including the clamp unit 34 to output the correction amount subjected to the clamp processing based on at least one of the upper limit value and the lower limit value. The correction amount arithmetic unit 14a performs the clamp processing using the clamp unit 34 to prevent output of the correction amount larger than the upper limit value or the correction amount smaller than the lower limit value.

The change rate calculation unit 35 calculates a change rate at which the correction amount is changed. The change rate calculation unit 35 calculates the change rate when the correction amount is changed from zero to the correction amount subjected to clamping, and the change rate when the correction amount is changed from the correction amount subjected to clamping to zero. For example, assuming that t=0 is a time point at which the X-axis drive unit 93X starts changing the acceleration, the change rate calculation unit 35 calculates the change rate in a case where the correction amount is linearly changed with respect to time "t" up to the correction amount subjected to clamping. The change rate calculation unit 35 may calculate the change rate by an arbitrary function such as a linear function, a quadratic function, a trigonometric function, or an exponential function, or may calculate the change rate by a formula approximated by a combination of these functions. The change rate calculation unit 35 outputs the correction amount changed in accordance with the change rate calculated.

Figure 12:
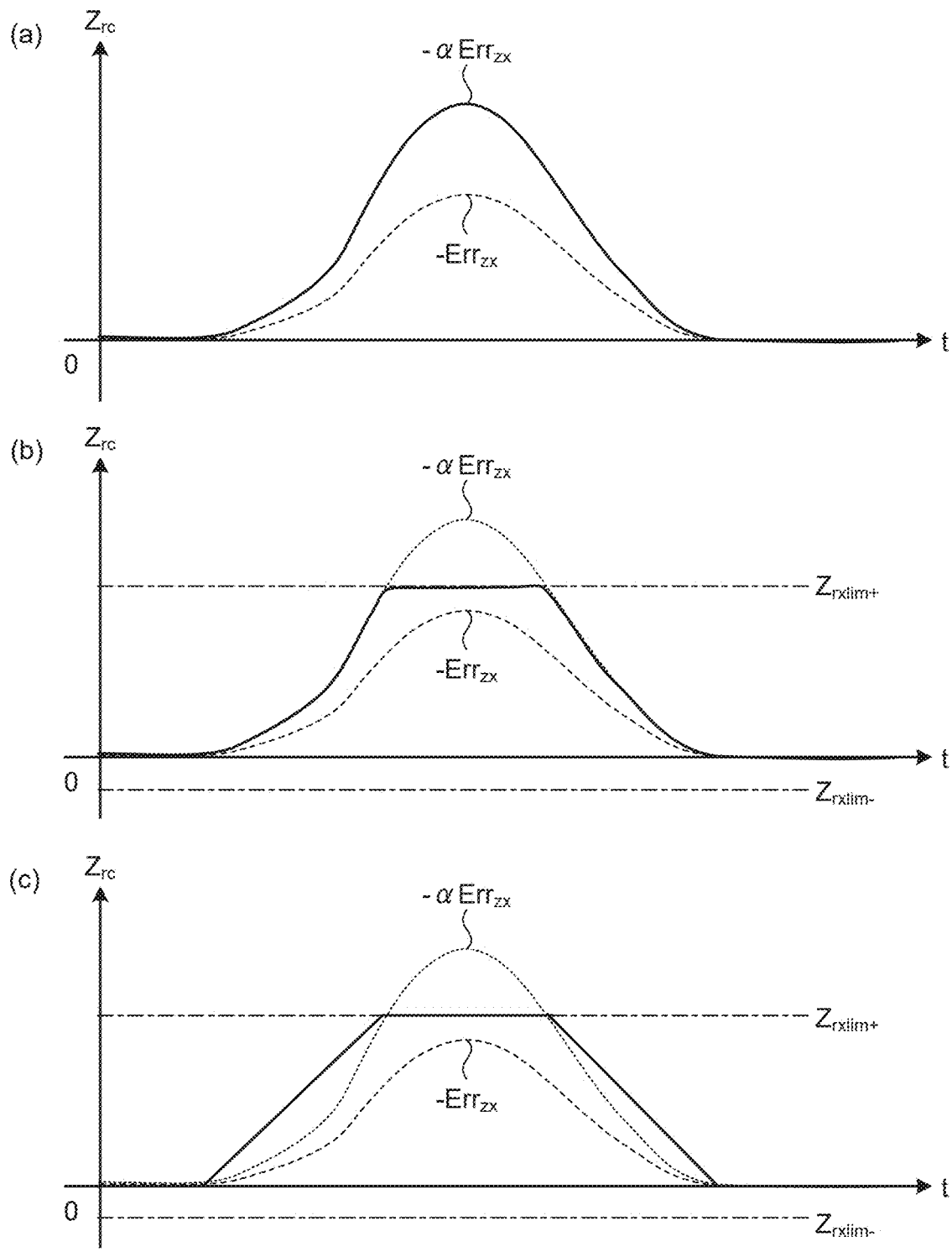
FIG. 12 is a set of graphs for explaining exemplary calculation of a correction amount by the correction amount calculation unit illustrated in FIG. 11.

FIG. 12 is a set of graphs for explaining exemplary calculation of the correction amount by the correction amount calculation unit 32b illustrated in FIG. 11. FIG. 12 uses the graphs to illustrate an outline of approximation calculation of the correction amount performed by the correction amount calculation unit 32b. The vertical axes of the graphs of (a), (b), and (c) in FIG. 12 represent "$Z_{rc}$" that is the correction amount in the Z direction. The horizontal axes of the graphs of (a), (b), and (c) in FIG. 12 represent time "t".

(a) of FIG. 12 illustrates a graph representing "$-\text{Err}_{zx}$" obtained by adding a minus sign to "$\text{Err}_{zx}$" that is the error amount component in the Z direction, and a graph representing "$-\alpha\text{Err}_{zx}$" that is the reference correction amount calculated by the reference correction amount calculation unit 33. The numerical controller 1a uses the reference correction amount calculation unit 33 to calculate the reference correction amount, thereby being able to perform correction corresponding to the error amount actually generated at the time of starting or ending the correction, and avoid a delay in the correction.

In (b) of FIG. 12, a graph representing the correction amount obtained by the clamp processing by the clamp unit 34 is indicated by a solid line. Here, a result of the clamp processing on "$-\alpha\text{Err}_{zx}$" with the upper limit value $Z_{rlim+}$ is illustrated. The numerical controller 1a uses the clamp unit 34 to perform the clamp processing, thereby preventing output of the correction amount larger than the upper limit value or the correction amount smaller than the lower limit value. As a result, the numerical controller 1a can avoid the generation of an uncut portion that cannot be machined before and after the acceleration/deceleration.

In (c) of FIG. 12, a graph representing the correction amount when the correction amount obtained from the clamp processing is changed in accordance with the change rate calculated by the change rate calculation unit 35 is indicated by a solid line. The correction amount increases at a constant change rate from the time when the change in acceleration is started until the correction amount reaches "$Z_{rlim+}$". After the correction amount is kept at "$Z_{rlim+}$", the correction amount decreases at a constant change rate. The numerical controller 1a changes the correction amount in accordance with the change rate calculated by the change rate calculation unit 35, thereby being able to obtain the correction amount by simple arithmetic operation.

In the above description, the correction amount calculation unit 32b calculates the correction amount from "$-\text{Err}_{zx}$", but the present disclosure is not limited thereto. The correction amount calculation unit 32b may calculate the correction amount from "$-\text{Err}_{zx}G_{zm}^{-1}$" that is the correction amount capable of compensating for the characteristics of the control system. Also, in the above description, the clamp unit 34 and the change rate calculation unit 35 are provided in the correction amount calculation unit 32b, but one of the clamp unit 34 and the change rate calculation unit 35 may be omitted in the correction amount calculation unit 32b.

In the second embodiment, the correction amount arithmetic unit 14a may output the correction amount when the tool 76 moves toward the machining surface in the error direction, and may set the correction amount to zero when the tool 76 moves away from the machining surface in the error direction. In this case, the numerical controller 1a performs correction only on excessive cutting and not on leaving the uncut portion. As a result, the numerical controller 1a can reduce the machining error that causes a visually conspicuous flaw.

According to the second embodiment, the numerical controller 1a and the numerical control machine tool 99a have an effect of being able to calculate, by the simple approximation calculation, the correction amount that enables highly accurate correction of the machining error in a case where it is difficult to strictly model the machining error.

Third Embodiment

A third embodiment will describe an example of performing correction time adjustment by which the correction amount is kept for a certain period of time. The configuration of the numerical control machine tool 99a according to the third embodiment is similar to the configuration of the numerical control machine tool 99a according to the first embodiment. In the third embodiment, components identical to those in the above first or second embodiment are denoted by the same reference numerals as those assigned to such components in the first or second embodiment, and a configuration different from that of the first or second embodiment will be mainly described.

Figure 13:
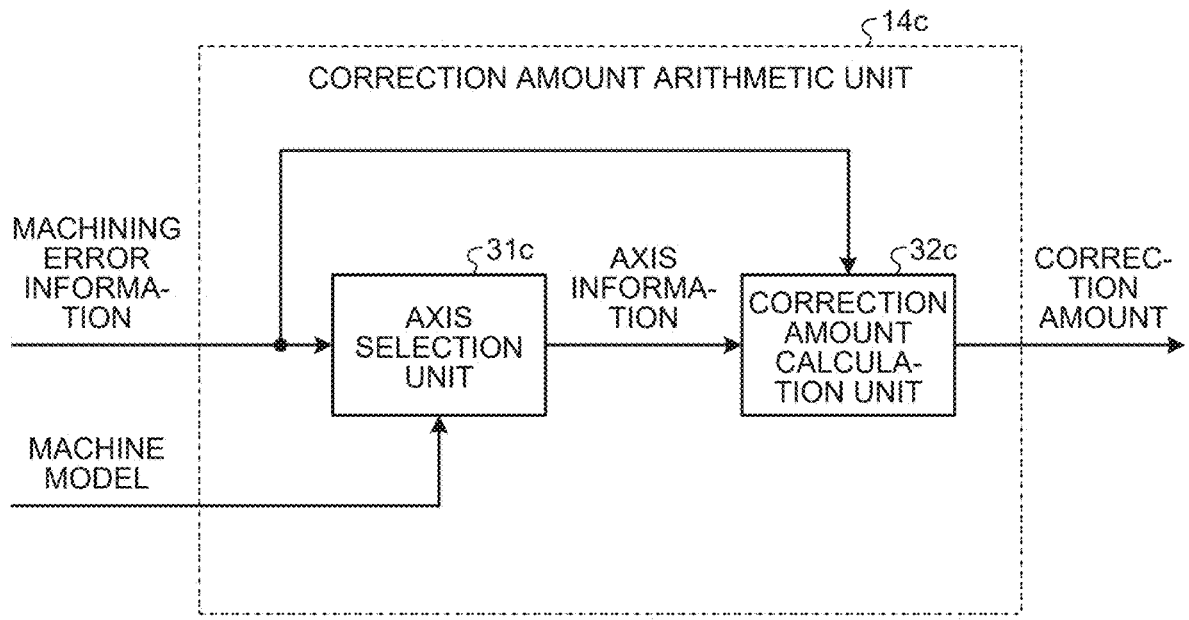
FIG. 13 is a diagram illustrating an exemplary configuration of a correction amount arithmetic unit included in a numerical controller according to a third embodiment.

FIG. 13 is a diagram illustrating an exemplary configuration of a correction amount arithmetic unit 14c included in the numerical controller 1a according to the third embodiment. In the third embodiment, the numerical controller 1a includes the correction amount arithmetic unit 14c instead of the correction amount arithmetic unit 14a illustrated in FIG. 6 and FIG. 9. The correction amount arithmetic unit 14c includes an axis selection unit 31c different from the axis selection unit 31a illustrated in FIG. 9, and a correction amount calculation unit 32c different from the correction amount calculation unit 32a illustrated in FIG. 9.

The machining error estimation unit 12 outputs, to the correction amount arithmetic unit 14c, the machining error information indicating the error direction in which the tool 76 is displaced and the error amount in the error direction. The correction amount arithmetic unit 14c reads the machine model from the model holding unit 13. The axis selection unit 31c selects one or more of the axes subject to correction on the basis of the machining error information and the machine model. The axis selection unit 31c outputs the axis information indicating the selected axis to the correction amount calculation unit 32c. The correction amount calculation unit 32c receives input of the machining error information and the axis information. The correction amount calculation unit 32c calculates the correction amount for each axis indicated in the axis information on the basis of the machining error information.

Figure 14:
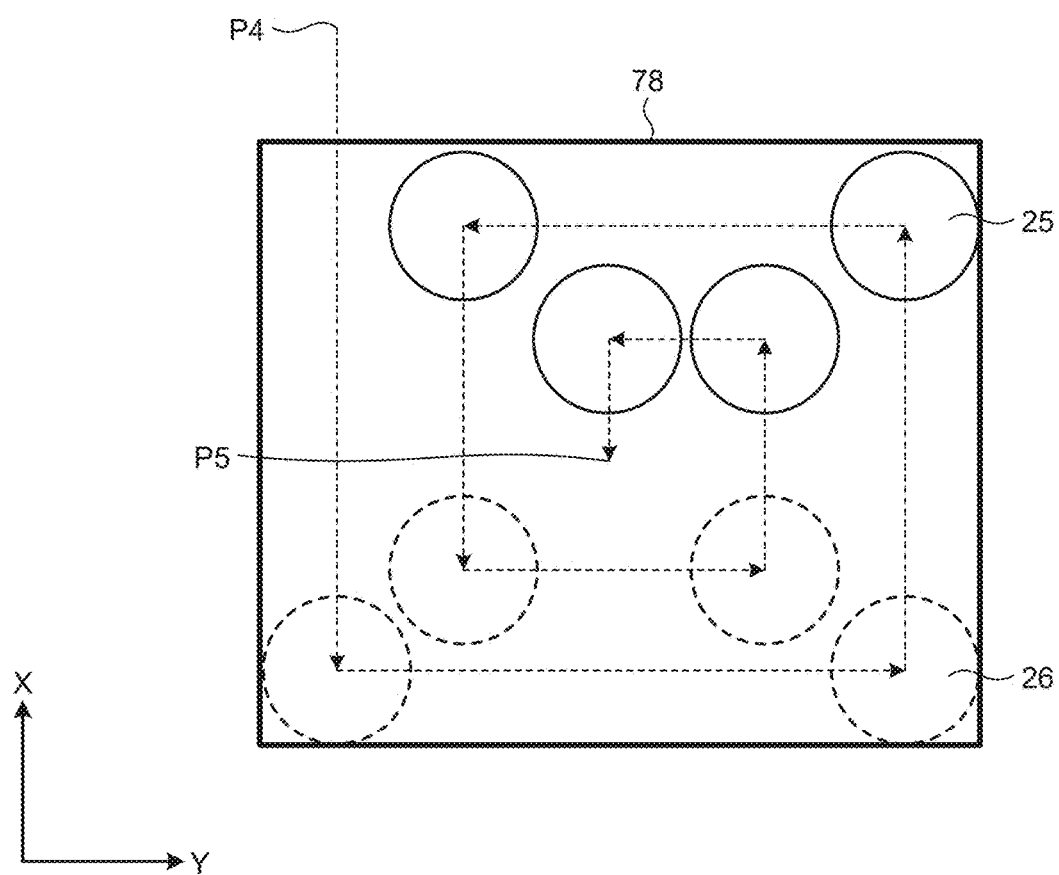
FIG. 14 is a diagram for explaining an example of machining by a numerical control machine tool according to the third embodiment.

Next, an example of machining by the numerical control machine tool 99a and exemplary calculation of the correction amount will be described. FIG. 14 is a diagram for explaining the example of machining by the numerical control machine tool 99a according to the third embodiment. FIG. 14 illustrates an example of a locus of the tool 76 when the machining surface of the workpiece 78 is machined by moving the tool 76 in an XY plane. A broken arrow illustrated in FIG. 14 indicates the locus of the tool 76. In this machining, the tool 76 is not moved in the Z direction.

The tool 76 starts to move from a machining start position P4 outside the workpiece 78, and moves counterclockwise along a spiral machining path from an outer peripheral portion of the workpiece 78 toward the center of the workpiece 78 while changing the direction of motion at corners. The tool 76 machines the surface of the workpiece 78 while moving counterclockwise along the spiral machining path. The tool 76 machines the surface of the workpiece 78 until reaching a machining end position P5 near the center of the workpiece 78 in the XY plane.

At the position where the direction of motion of the tool 76 changes, the X-axis drive unit 93X or the Y-axis drive unit 93Y performs acceleration/deceleration. A circle 25 indicated by a solid line in FIG. 14 represents a machining error shape due to excessive cutting of the machining surface. The machining error shape represented by the circle 25 is caused by the tool 76 sinking into the machining surface during acceleration/deceleration. A circle 26 indicated by a broken line in FIG. 14 represents a machining error shape due to an uncut portion left on the machining surface. The machining error shape represented by the circle 26 is caused by the tool 76 being lifted off the machining surface during acceleration/deceleration. As illustrated in FIG. 14, the machining error shape represented by the circle 25 is generated on half of the machining surface corresponding to the positive X direction. The machining error shape represented by the circle 26 is generated on half of the machining surface corresponding to the negative X direction.

Driving of the X-axis drive unit 93X causes a machining error of "$Err_{xx}$" in the X direction, a machining error of "$Err_{yx}$" in the Y direction, and a machining error of "$Err_{zx}$" in the Z direction. Driving of the Y-axis drive unit 93Y causes a machining error of "$Err_{xy}$" in the X direction, a machining error of "$Err_{yy}$" in the Y direction, and a machining error of "$Err_{zy}$" in the Z direction. The machining error estimation unit 12 calculates the error amount of each of the machining errors on the basis of the axis data and the machine model. Each of "$Err_{zx}$" and "$Err_{zy}$" is the error amount component in the direction perpendicular to the machining surface. In the case of machining illustrated in FIG. 14, the axis selection unit 31c selects the Z direction as the axis subject to correction.

The correction amount calculation unit 32c receives input of the machining error information and the axis information. The correction amount calculation unit 32c calculates the correction amount for each axis indicated in the axis information on the basis of the machining error information. In the case of the example illustrated in FIG. 14, the correction amount calculation unit 32c calculates, on the basis of the axis information indicating the Z direction and the machining error information, the correction amount for correcting the machining error in the Z direction due to driving of the X-axis drive unit 93X and the machining error in the Z direction due to driving of the Y-axis drive unit 93Y. That is, the correction amount calculation unit 32c calculates the correction amount $Z_{rc}$ for correcting the motion of the driven unit associated with the Z-axis drive unit 93Z.

Figure 15:
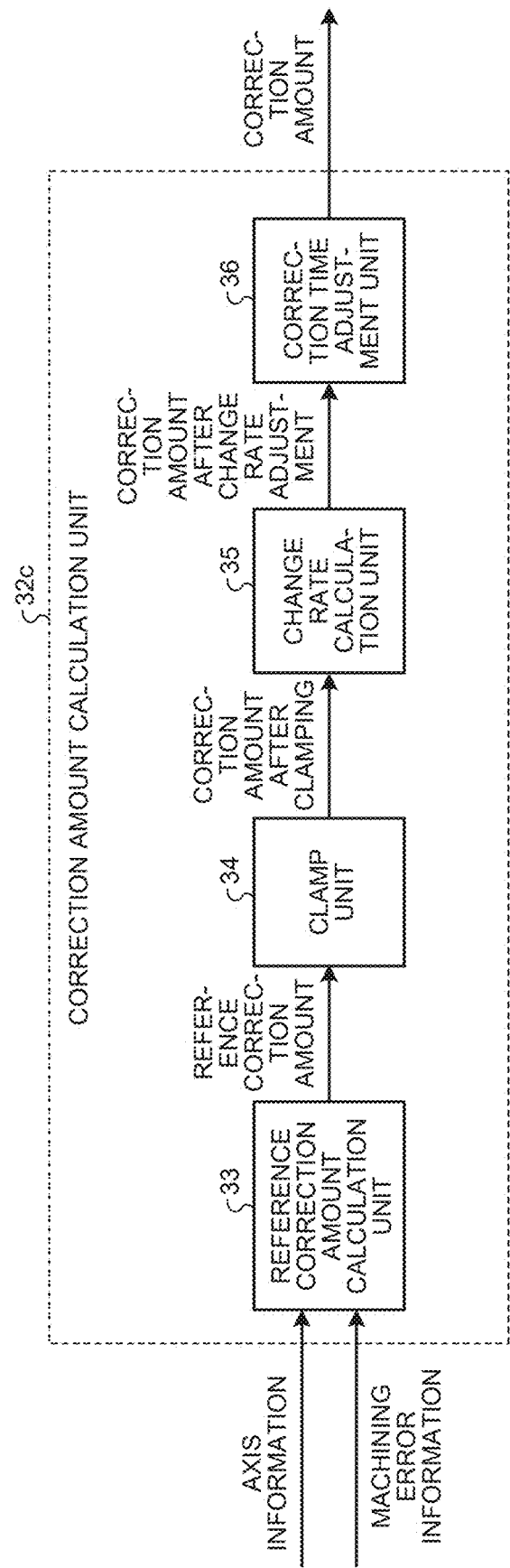
FIG. 15 is a diagram illustrating an exemplary configuration of a correction amount calculation unit included in the correction amount arithmetic unit illustrated in FIG. 13.

FIG. 15 is a diagram illustrating an exemplary configuration of the correction amount calculation unit 32c included in the correction amount arithmetic unit 14c illustrated in FIG. 13. As with the correction amount calculation unit 32b illustrated in FIG. 11, the correction amount calculation unit 32c includes the reference correction amount calculation unit 33, the clamp unit 34, and the change rate calculation unit 35. The correction amount calculation unit 32c further includes a correction time adjustment unit 36.

The reference correction amount calculation unit 33 calculates the reference correction amount as the reference value of the correction amount on the basis of the axis information and the machining error information for each axial direction. The reference correction amount obtained from "$Err_{zx}$" is "$-\alpha_x Err_{zx}$". The reference correction amount obtained from "$Err_{zy}$" is "$-\alpha_y Err_{xy}$". Here, "$\alpha_x$" and "$\alpha_y$" are arbitrary real numbers. The reference correction amount calculation unit 33 outputs the information on the reference correction amount to the clamp unit 34.

The clamp unit 34 performs clamp processing on the reference correction amounts exceeding "$Z_{rxlim+}$" and "$Z_{rylim+}$", which are upper limit values of the correction amount, with the upper limit values $Z_{rxlim+}$ and $Z_{rylim+}$, respectively. Alternatively, the clamp unit 34 performs clamp processing on the reference correction amounts falling below "$Z_{rxlim-}$" and "$Z_{rylim-}$", which are lower limit values of the correction amount, with the lower limit values $Z_{rxlim-}$ and $Z_{rylim-}$, respectively. "$Z_{rxlim+}$" is the upper limit value of the correction amount for the machining error in the Z direction caused by the driving of the X-axis drive unit 93X. "$Z_{rylim+}$" is the upper limit value of the correction amount for the machining error in the Z direction caused by the driving of the Y-axis drive unit 93Y. "$Z_{rxlim-}$" is the lower limit value of the correction amount for the machining error in the Z direction caused by the driving of the X-axis drive unit 93X. "$Z_{rxlim+}$" is the lower limit value of the correction amount for the machining error in the Z direction caused by the driving of the Y-axis drive unit 93Y. The clamp unit 34 outputs information on the correction amount after clamping to the change rate calculation unit 35.

The change rate calculation unit 35 calculates the change rate at which the correction amount is changed. The change rate calculation unit 35 outputs the correction amount changed in accordance with the calculated change rate to the correction time adjustment unit 36. The correction time adjustment unit 36 performs adjustment of keeping the correction amount for a certain period of time when the correction amount reaches the upper limit value or the lower limit value that is the reference of the clamp processing. The correction amount arithmetic unit 14c includes the correction amount calculation unit 32c including the correction time adjustment unit 36 to keep the correction amount for the certain period of time when the correction amount reaches the upper limit value or the lower limit value that is the reference of the clamp processing.

Figure 16:
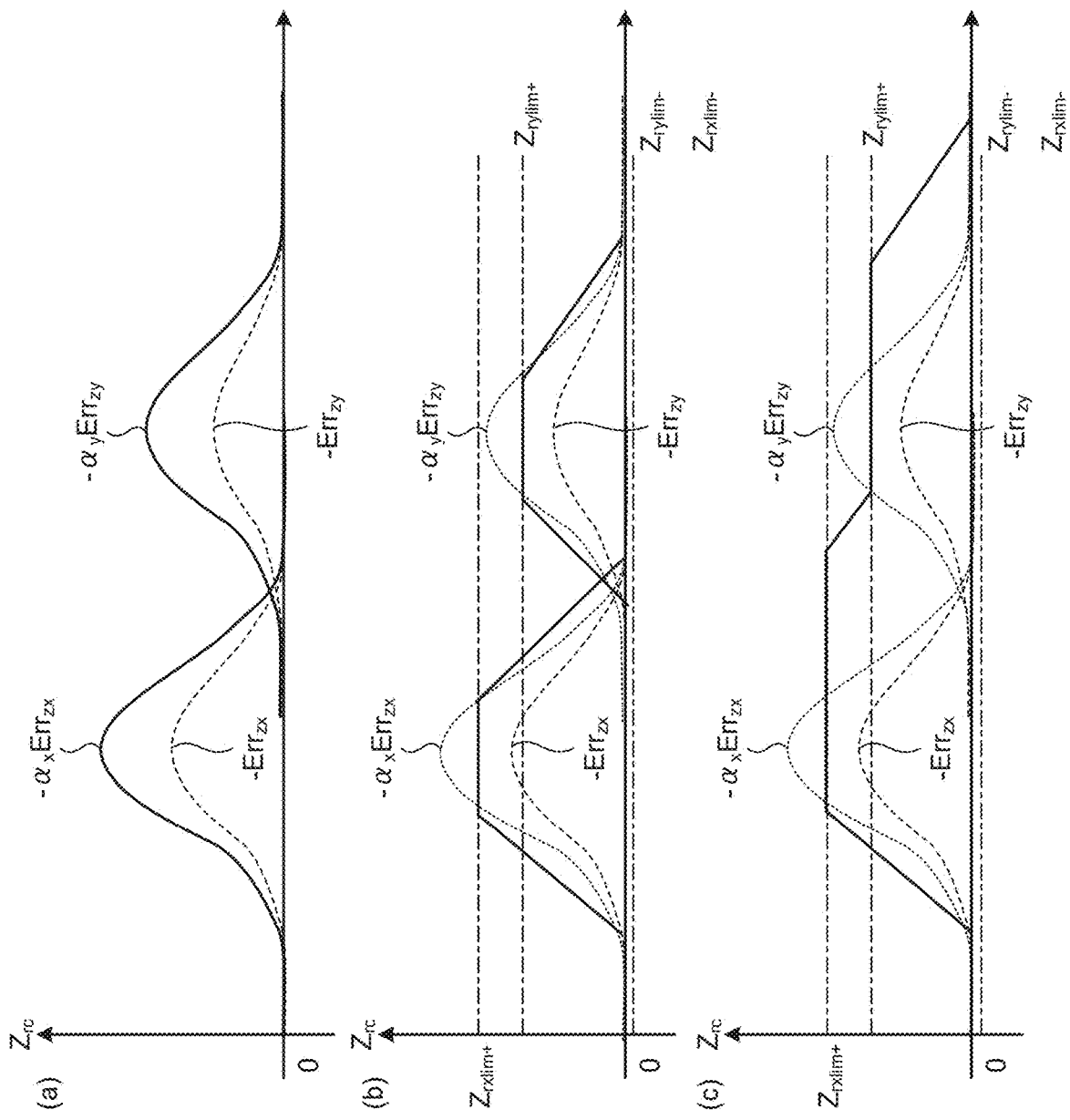
FIG. 16 is a set of graphs for explaining exemplary calculation of a correction amount by the correction amount calculation unit illustrated in FIG. 15.

FIG. 16 is a set of graphs for explaining exemplary calculation of the correction amount by the correction amount calculation unit 32c illustrated in FIG. 15. FIG. 16 uses the graphs to illustrate an outline of approximation calculation of the correction amount performed by the correction amount calculation unit 32c. The vertical axes of the graphs of (a), (b), and (c) in FIG. 16 represent the correction amount $Z_{rc}$ in the Z direction. The horizontal axes of the graphs of (a), (b), and (c) in FIG. 16 represent time "t".

(a) of FIG. 16 illustrates graphs representing "$-\text{Err}_{zx}$" and "$-\text{Err}_{zy}$" obtained by adding a minus sign to each of "$\text{Err}_{zx}$" and "$\text{Err}_{zy}$" as the error amount components in the Z direction, and graphs representing "$-\alpha_x\text{Err}_{zx}$" and "$-\alpha_y\text{Err}_{zy}$;" that are the reference correction amounts calculated by the reference correction amount calculation unit 33. The numerical controller 1a uses the reference correction amount calculation unit 33 to calculate the reference correction amounts, thereby being able to perform correction corresponding to the error amount actually generated at the time of starting or ending the correction, and avoid a delay in the correction.

In (b) of FIG. 16, graphs representing the correction amounts obtained through the processing by the clamp unit 34 and the processing by the change rate calculation unit 35 are indicated by solid lines. The graphs indicated by the solid lines in (b) of FIG. 16 represent the correction amounts when the correction amounts obtained from the clamp processing are changed in accordance with the change rates calculated by the change rate calculation unit 35. Here, the graphs indicated by the solid lines in (b) of FIG. 16 represent a result of changing the correction amount, which is obtained by performing the clamp processing on "$-\alpha_x\text{Err}_{zx}$" using the upper limit value $Z_{rxlim+}$, in accordance with the change rate and a result of changing the correction amount, which is obtained by performing the clamp processing on "$-\alpha_y\text{Err}_{zy}$" using the upper limit value $Z_{rylim+}$, in accordance with the change rate. "$Z_{rxlim+}$" and "$Z_{rylim+}$" take the values different from each other. Note that "$Z_{rxlim-}$" and "$Z_{rylim-}$" are both set to zero. The numerical controller 1a uses the clamp unit 34 to perform the clamp processing, thereby preventing output of the correction amount larger than the upper limit value or the correction amount smaller than the lower limit value. As a result, the numerical controller 1a can avoid the generation of an uncut portion that cannot be machined before and after the acceleration/deceleration. The numerical controller 1a changes the correction amounts in accordance with the change rates calculated by the change rate calculation unit 35, thereby being able to obtain the correction amounts by simple arithmetic operation.

In (c) of FIG. 16, a graph representing the correction amount obtained through the adjustment by correction time adjustment unit 36 is indicated by a solid line. In the example illustrated in (c) of FIG. 16, the time for which the correction amount is kept at "$Zr_{rxlim+}$" is longer than that in the case of the correction amount indicated by the solid line in (b) of FIG. 16. Also, in the example illustrated in (c) of FIG. 16, the time for which the correction amount is kept at "$Z_{rxlim+}$" is longer than that in the case of the correction amount indicated by the solid line in (b) of FIG. 16. The time for which the correction amount is kept at "$Z_{rxlim+}$" and the time for which the correction amount is kept at "$Z_{rylim+}$" can be set at will. Here, the example of adjusting the time for which the correction amount is kept at the upper limit value has been described, but for the correction amount subjected to the clamp processing with the lower limit value, the correction time adjustment unit 36 adjusts the time for which the correction amount is kept at the lower limit value.

The numerical controller 1a keeps the correction amount for the certain period of time when the correction amount reaches the upper limit value or the lower limit value, thereby allowing the machining of a portion, such as the corner where the machining error can occur in succession, to proceed without reducing the correction amount. The numerical controller 1a can avoid occurrence of a flaw due to an overshoot when a correction motion, which is a motion for correcting the machining error, is repeated in a short distance. As a result, the numerical controller 1a can prevent a decrease in quality of the machining surface.

In a case where the machining error occurs due to the tool 76 being lifted off the machining surface, the tool 76 may sink into the machining surface due to an overshoot when the tool 76 being lifted moves back to the machining surface. The correction amount arithmetic unit 14c may perform arithmetic to find the correction amount for preventing excessive cutting of the machining surface due to the overshoot. In this case, the reference correction amount calculation unit 33 calculates the reference correction amount using "$\alpha_x$" and "$\alpha_x$" that are set to negative values, whereby the numerical controller 1a can reduce the machining error due to the overshoot.

According to the third embodiment, the numerical controller 1a and the numerical control machine tool 99a keep the correction amount for the certain period of time when the correction amount reaches the upper limit value or the lower limit value. As a result, the numerical controller 1a and the numerical control machine tool 99a have an effect of being able to perform arithmetic to find the correction amount appropriate for reducing the occurrence of a flaw in the portion where the machining error can occur in succession.

Fourth Embodiment

Figure 17:
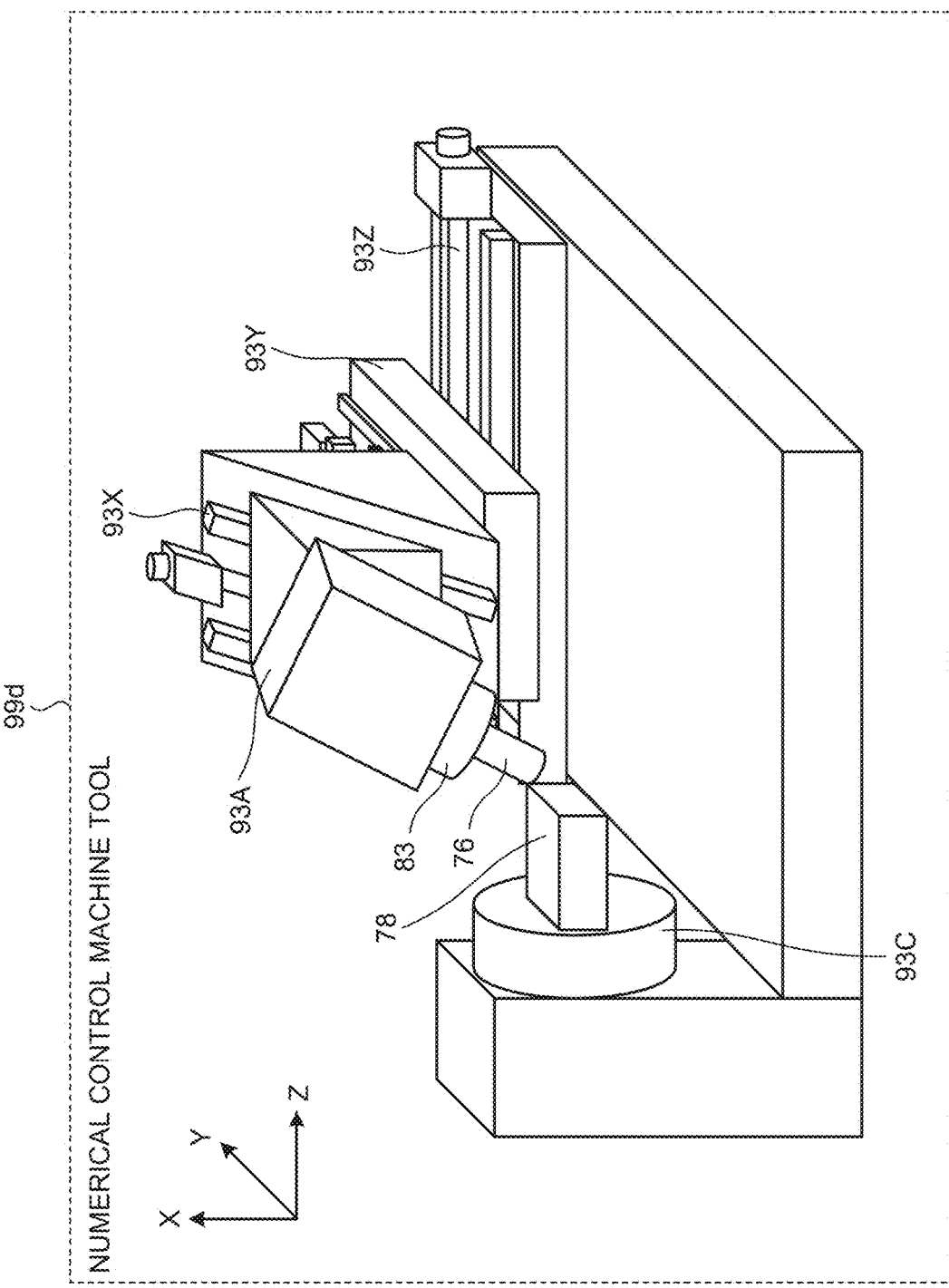
FIG. 17 is a diagram illustrating an exemplary configuration of a numerical control machine tool according to a fourth embodiment.

A fourth embodiment will describe exemplary calculation of the correction amount in a numerical control machine tool having a configuration different from that of the numerical control machine tool 99a illustrated in FIG. 1. FIG. 17 is a diagram illustrating an exemplary configuration of a numerical control machine tool 99d according to the fourth embodiment. The numerical control machine tool 99d is a machine tool that drives an axis in accordance with a machining program. The numerical control machine tool 99d is a lathe-type five-axis multi-tasking machine including three straight axes and two rotary axes. In the fourth embodiment, components identical to those in the above first to third embodiments are denoted by the same reference numerals as those assigned to such components in the first to third embodiments, and a configuration different from that of the first to third embodiments will be mainly described.

The numerical control machine tool 99d includes the X-axis drive unit 93X, the Y-axis drive unit 93Y, the Z-axis drive unit 93Z, an A-axis drive unit 93A, and the C-axis drive unit 93C. The X axis, the Y axis, and the Z axis are each the straight axis. An A axis and the C axis are each the rotary axis. The numerical control machine tool 99d drives the X-axis drive unit 93X, the Y-axis drive unit 93Y, and the Z-axis drive unit 93Z to move the tool 76 in the X direction, the Y direction, and the Z direction. The A-axis drive unit 93A causes the tool 76 to perform rotary motion about the Y axis. The C-axis drive unit 93C causes the workpiece 78 to perform rotary motion about the Z axis. The X-axis drive unit 93X includes a configuration called a slant axis. The numerical control machine tool 99d moves the tool 76 in the X direction by simultaneously driving the X-axis drive unit 93X and the Y-axis drive unit 93Y.

The numerical control machine tool 99d is different from the numerical control machine tool 99a illustrated in FIG. 1 in including the X-axis drive unit 93X, which is the slant axis, and the A-axis drive unit 93A, which causes the tool 76 to perform rotary motion, so that a tool axis direction does not coincide with a drive axis direction. Therefore, the direction of the machining surface and the error direction in which the machining error occurs in the numerical control machine tool 99d are greatly different from the case of the numerical control machine tool 99*a*. Note that the numerical controller 1*a* included in the numerical control machine tool 99*d* includes a configuration similar to that of the numerical controller 1*a* illustrated in FIG. 6.

Figure 18:
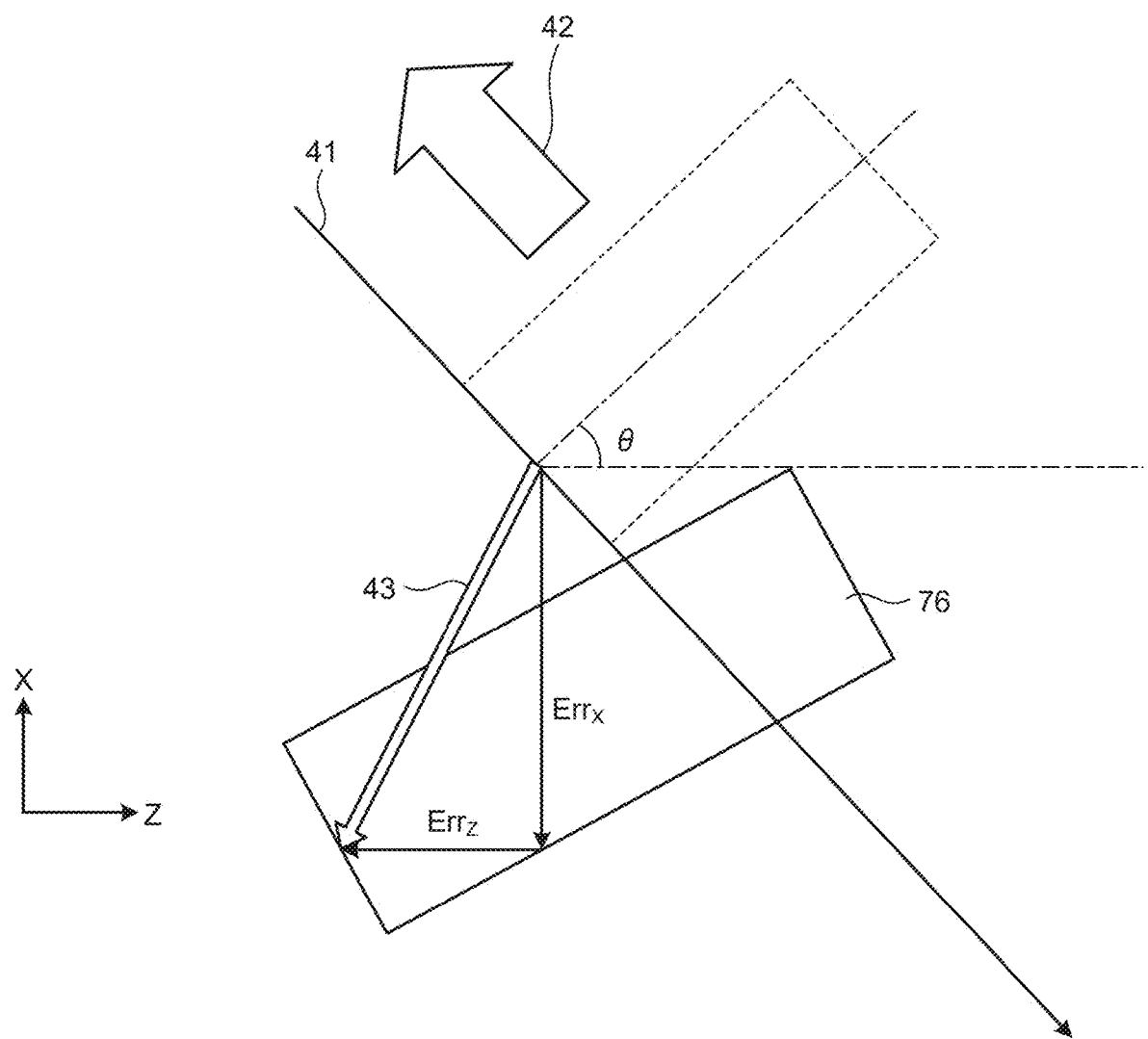
FIG. 18 is a diagram for explaining exemplary calculation of a machining error by a numerical controller included in the numerical control machine tool according to the fourth embodiment.

Next, exemplary calculation of the machining error by the numerical controller 1*a* will be described. FIG. 18 is a diagram for explaining the exemplary calculation of the machining error by the numerical controller 1*a* included in the numerical control machine tool 99*d* according to the fourth embodiment. FIG. 18 illustrates how a machining surface 41 perpendicular to the tool axis is machined in a state where "A", which is the angle of the A axis, is 45 degrees. An arrow 42 indicates a machining direction. The machining direction is an oblique direction between the positive X direction and the negative Z direction. FIG. 18 schematically illustrates how the machining error occurs in which the tool 76 sinks into the machining surface 41 during machining of the machining surface 41. In FIG. 18, the tool 76 in an ideal state in which the mechanical structure 98 is not deformed is indicated by a broken line.

In the machining illustrated in FIG. 18, the X-axis drive unit 93X, the Y-axis drive unit 93Y, and the Z-axis drive unit 93Z are driven simultaneously. The driving of the X-axis drive unit 93X causes the machining error of "$Err_{xx}$" in the X direction, the machining error of "$Err_{yx}$" in the Y direction, and the machining error of "$Err_{zx}$" in the Z direction. The driving of the Y-axis drive unit 93Y causes the machining error of "$Err_{xy}$" in the X direction, the machining error of "$Err_{yy}$" in the Y direction, and the machining error of "$Err_{zy}$" in the Z direction. The driving of the Z-axis drive unit 93Z causes a machining error of "$Err_{xz}$" in the X direction, a machining error of "$Err_{yz}$" in the Y direction, and a machining error of "$Err_{zz}$" in the Z direction.

In the fourth embodiment, the correction amount arithmetic unit 14*a* of the numerical controller 1*a* includes a configuration similar to that of the correction amount arithmetic unit 14*a* illustrated in FIG. 9. The axis selection unit 31*a* selects one or more of the axes subject to correction on the basis of the machining error information and the machine model.

"$Err_X$" as a total error amount in the X direction in the numerical control machine tool 99*d* is obtained by the following Formula (4). "$Err_Y$" as a total error amount in the Y direction in the numerical control machine tool 99*d* is obtained by the following Formula (5). "$Err_Z$" as a total error amount in the Z direction in the numerical control machine tool 99*d* is obtained by the following Formula (6). Note that an arrow 43 illustrated in FIG. 18 indicates the error amount as a sum of "$Err_X$", "$Err_Y$", and "$Err_Z$".

Formula 4:

$$Err_X = Err_{xx} + Err_{xy} + Err_{xz} \quad (4)$$

Formula 5:

$$Err_Y = Err_{yx} + Err_{yy} + Err_{yz} \quad (5)$$

Formula 6:

$$Err_Z = Err_{zx} + Err_{zy} + Err_{zz} \quad (4)$$

As the distance between the center of gravity of the mechanical structure 98 and the drive point of the mechanical structure 98 is longer, the mechanical structure 98 is more likely to undergo a large deformation. Therefore, in the numerical control machine tool 99*d*, the mechanical structure 98 is likely to undergo a deformation in the X direction and the Z direction by the driving of the X-axis drive unit 93X and the driving of the Z-axis drive unit 93Z. For example, in the occurrence of the machining error in which either "$Err_X$" or "$Err_Z$" is dominant, the correction amount arithmetic unit 14*a* can perform arithmetic to find the correction amount similarly to the case of the first embodiment or the second embodiment. In the occurrence of the machining error in which "$Err_X$" and "$Err_Z$" contribute to a similar extent, the correction amount arithmetic unit 14*a* needs to perform arithmetic to find the error amount that is in a direction perpendicular to the machining surface 41.

"$Err_N$" as the error amount in the direction perpendicular to the machining surface 41 is obtained by the following Formula (7).

Formula 7

$$Err_N = \sqrt{Err_X^2 + Err_Z^2} \cos(\theta - \phi) \quad (7)$$

Here, "φ" satisfies the following Formula (8).

Formula 8

$$\phi = \tan^{-1} \frac{Err_X}{Err_Z} \quad (8)$$

In the occurrence of "$Err_N$" in the direction perpendicular to the machining surface 41, the correction amount calculation unit 32*a* can set "$-Err_N$" as the correction amount for offsetting "$Err_N$". The correction amount calculation unit 32*a* uses the following Formulas (9), (10), and (11) to perform calculation of dividing "$-Err_N$" into "$X_{rc}$" as the correction amount in the X direction, "$Y_{rc}$" as the correction amount in the Y direction, and "$Z_{rc}$" as the correction amount in the Z direction. "δ" is the angle between the X axis and the Y axis. Here, δ=π/4 (rad).

Formula 9:

$$X_{rc} = -Err_N \sin\theta \sin\delta \quad (9)$$

Formula 10:

$$Y_{rc} = -Err_N \sin\theta \cos\delta \quad (10)$$

Formula 11:

$$Z_{rc} = -Err_N \cos\theta \quad (11)$$

Note that in the above description, the numerical controller 1*a* includes the configuration similar to that of the first embodiment, but the present disclosure is not limited thereto. The configuration of the numerical controller 1*a* in the fourth embodiment may be similar to that in the second embodiment or the third embodiment.

According to the fourth embodiment, the numerical controller 1*a* and the numerical control machine tool 99*d* can perform arithmetic to find the correction amount that is appropriate even in the case where the numerical control machine tool 99*d* includes the configuration in which the tool axis direction does not coincide with the drive axis direction. As a result, the numerical controller 1*a* and the numerical control machine tool 99*d* have an effect of being able to reduce the machining error.

Fifth Embodiment

Figure 19:
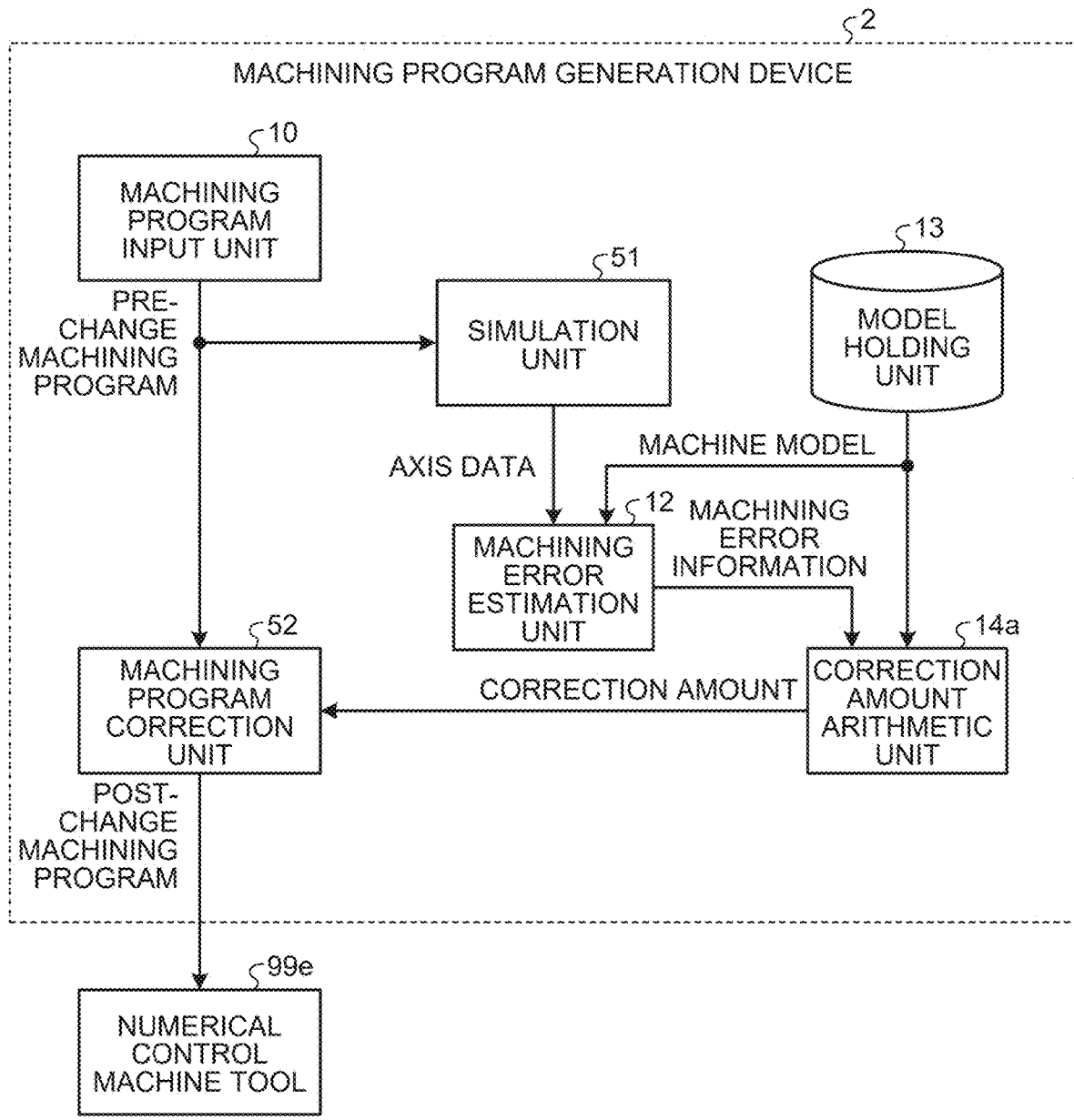
FIG. 19 is a diagram illustrating an exemplary configuration of a machining program generation device according to a fifth embodiment.

A fifth embodiment will describe an example in which the machining program for correcting the machining error is generated by a machining program generation device. FIG. 19 is a diagram illustrating an exemplary configuration of a machining program generation device 2 according to the fifth embodiment. In the fifth embodiment, components identical to those in the above first to fourth embodiments are denoted by the same reference numerals as those assigned to such components in the first to fourth embodiments, and a configuration different from that of the first to fourth embodiments will be mainly described.

The machining program generation device 2 is a device that creates the machining program for correcting the machining error of the numerical control machine tool. The machining program generation device 2 is an attached program that is attached to the CAM software, the interactive program creation device, or the like and edits the machining program. The machining program generation device 2 makes a change for correcting the machining error to the machining program based on shape data that specifies a machined shape, thereby generating the machining program for correcting the machining error. Hereinafter, a pre-change machining program refers to the machining program before the change for correcting the machining error is made thereto.

The machining program generation device 2 includes the machining program input unit 10 that receives the pre-change machining program, the machining error estimation unit 12 that estimates the machining error, the model holding unit 13 that holds the machine model, the correction amount arithmetic unit 14a that performs arithmetic to obtain the correction amount, a simulation unit 51 that simulates an operation of a numerical control machine tool 99e, and a machining program correction unit 52 that corrects the pre-change machining program in accordance with the correction amount.

The machining program input unit 10 outputs the pre-change machining program received to each of the simulation unit 51 and the machining program correction unit 52. The simulation unit 51 simulates, on the basis of the pre-change machining program, the behavior of a numerical controller of the numerical control machine tool 99e and the behavior of the servo control unit 6 for each axis that is a servo controller of the numerical control machine tool 99e. The simulation unit 51 calculates the axis data on the basis of the machining path analyzed from the pre-change machining program that is the machining program before the correction amount is described therein. The simulation unit 51 uses a known simulation method for the servo controller and performs arithmetic to find the state quantity of each axis such as the position feedback, the velocity feedback, or the acceleration feedback. The simulation unit 51 outputs the axis data, which is the state quantity of each axis, to the machining error estimation unit 12.

The machining error estimation unit 12 reads the machine model from the model holding unit 13. On the basis of the axis data and the machine model, the machining error estimation unit 12 estimates the error direction, which is the direction in which displacement of the tool 76 occurs among the axial directions, and the error amount in the error direction, thereby outputting the machining error information indicating the error direction estimated and the error amount estimated. For example, the machining error estimation unit 12 calculates the error amount in each axial direction on the basis of the acceleration feedback acquired from the simulation unit 51, as in the case of the first embodiment. The machining error estimation unit 12 outputs the machining error information to the correction amount arithmetic unit 14a.

The correction amount arithmetic unit 14a reads the machine model from the model holding unit 13. The correction amount arithmetic unit 14a selects one or more of the axes subject to correction on the basis of the machining error information, and performs arithmetic to find the correction amount for correcting the motion by the drive mechanism 97 for the selected axis. The correction amount arithmetic unit 14a uses the axis selection unit 31a illustrated in FIG. 9 to select the axis subject to correction on the basis of the machine model and the machining error information for each axial direction. The correction amount arithmetic unit 14a uses the correction amount calculation unit 32a illustrated in FIG. 9 to calculate the correction amount for each axis indicated in the axis information on the basis of the machining error information. The correction amount calculation unit 32a outputs the information on the correction amount obtained to the machining program correction unit 52.

The machining program correction unit 52 corrects the pre-change machining program in accordance with the correction amount by adding a correction motion, which is a motion for correcting the machining error in accordance with the correction amount, to the pre-change machining program. The machining program correction unit 52 outputs a post-change machining program, which is the machining program subjected to the change of adding the correction motion, to the numerical control machine tool 99e. The numerical control machine tool 99e includes a configuration similar to that of the numerical control machine tool 99a illustrated in FIG. 1. The numerical controller of the numerical control machine tool 99e controls the drive mechanism 97 in accordance with the post-change machining program. The numerical controller of the numerical control machine tool 99e includes a machining program input unit to which the post-change machining program is input, a command value generation unit that generates a command value that is a position command for each axis in accordance with the post-change machining program, and a command value output unit that outputs the command value as the position command for each axis to the servo control unit 6.

Figure 20:
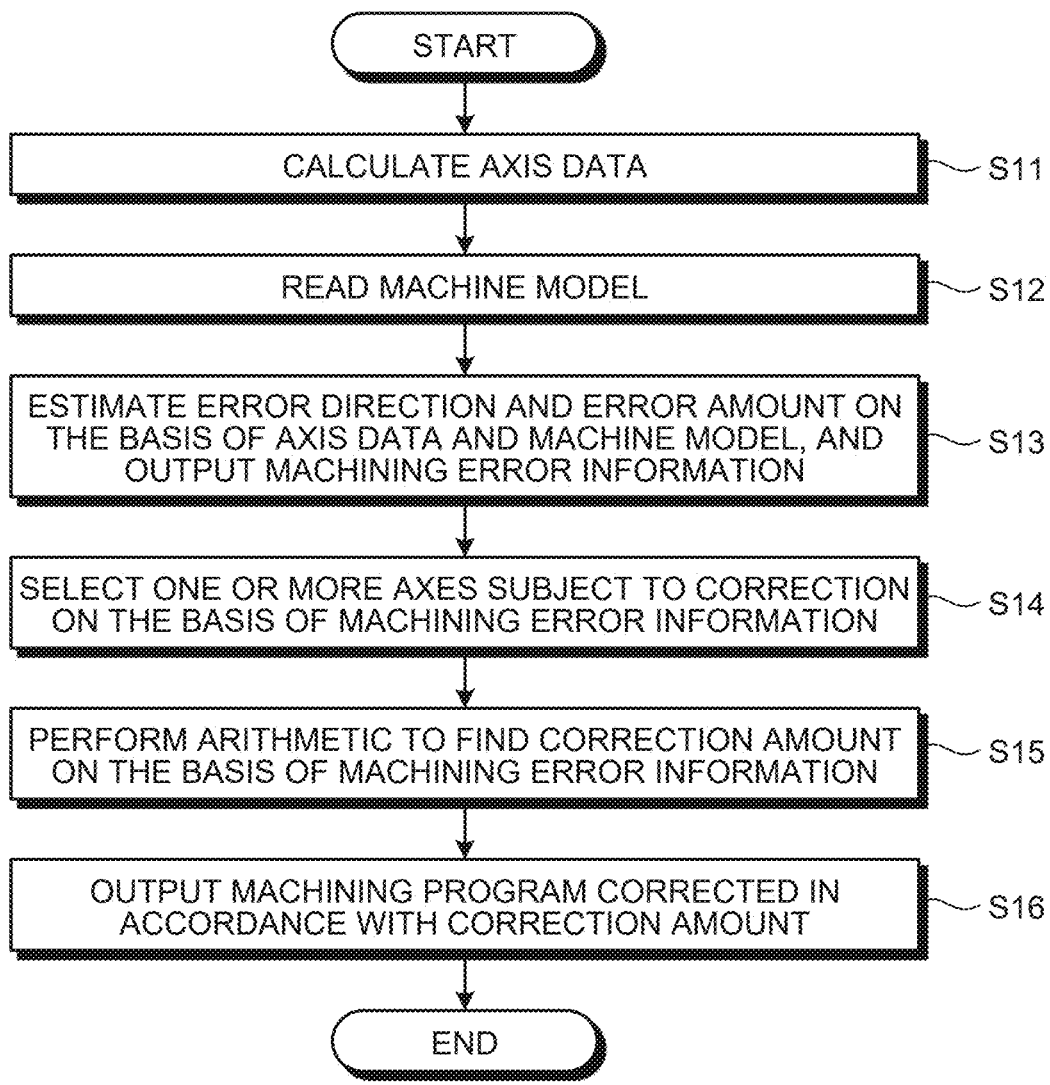
FIG. 20 is a flowchart illustrating a procedure of operation of the machining program generation device according to the fifth embodiment.

Next, a procedure of operation of the machining program generation device 2 will be described. FIG. 20 is a flowchart illustrating the procedure of operation of the machining program generation device 2 according to the fifth embodiment.

In step S11, the simulation unit 51 of the machining program generation device 2 calculates the axis data on the basis of the pre-change machining program. The simulation unit 51 outputs the axis data to the machining error estimation unit 12.

In step S12, the machining error estimation unit 12 reads the machine model from the model holding unit 13. In step S13, the machining error estimation unit 12 estimates the error direction and the error amount on the basis of the axis data and the machine model, and outputs the machining error information. The machining error estimation unit 12 estimates the error direction, which is the direction in which the tool 76 is displaced among the axial directions, and the error amount in the error direction. The machining error estimation unit 12 outputs the machining error information indicating the error direction estimated and the error amount estimated.

In step S14, the correction amount arithmetic unit 14a of the machining program generation device 2 uses the axis selection unit 31a to select one or more of the axes subject to correction on the basis of the machining error information. In step S15, the correction amount arithmetic unit 14a performs arithmetic, using the correction amount calculation unit 32a, to find the correction amount on the basis of the machining error information. The correction amount calculation unit 32a outputs the information on the correction amount obtained to the machining program correction unit 52.

The machining program correction unit 52 corrects the pre-change machining program in accordance with the correction amount by adding the correction motion for correcting the machining error in accordance with the correction amount to the pre-change machining program. In step S16, the machining program correction unit 52 outputs the post-change machining program that is the machining program corrected in accordance with the correction amount. The machining program generation device 2 thus ends the operation according to the procedure illustrated in FIG. 20.

Figure 21:
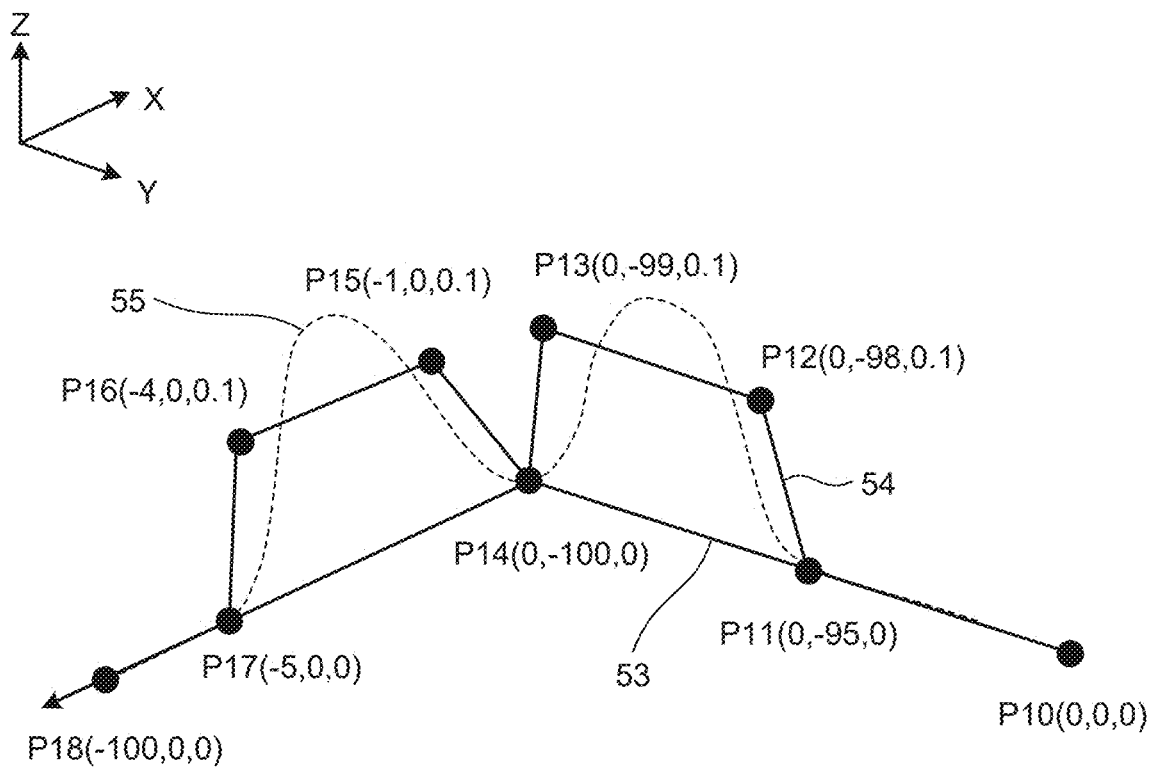
FIG. 21 is a diagram for explaining a first example of a machining program generated by the machining program generation device according to the fifth embodiment.

FIG. 21 is a diagram for explaining a first example of the machining program generated by the machining program generation device 2 according to the fifth embodiment. FIG. 21 illustrates an example of the machining path indicated in the pre-change machining program and an example of the machining path indicated in the post-change machining program. The machining paths illustrated in FIG. 21 are machining paths at a corner.

A path 53 illustrated in FIG. 21 is the machining path indicated in the pre-change machining program. The path 53 is a path that sequentially passes through five points of P10, P11, P14, P17, and P18. A path 54 illustrated in FIG. 21 is the machining path indicated in the post-change machining program. The path 54 includes a path that sequentially passes through P11, P12, P13, and P14 instead of the linear path between P11 and P14 in the path 53. In addition, the path 54 includes a path that sequentially passes through P14, P15, P16, and P17 instead of the linear path between P14 and P17 in the path 53.

The machining program correction unit 52 adds P11, which is the point at which the movement of the tool 76 in the Z direction toward P12 is started, to the pre-change machining program. The machining program correction unit 52 adds, to the pre-change machining program, a description of the motion of sequentially moving the tool 76 from P11 to P12, P13, and P14. The machining program correction unit 52 adds P17, which is the point at which the movement of the tool 76 from P16 in the Z direction is ended, to the pre-change machining program. The machining program correction unit 52 adds, to the pre-change machining program, a description of the motion of sequentially moving the tool 76 from P14 to P15, P16, and P17.

The machining program correction unit 52 reflects the correction amount, which is calculated by the method described with reference to FIG. 12, in each of the path sequentially passing through P11, P12, P13, and P14 and the path sequentially passing through P14, P15, P16, and P17. In FIG. 21, for reference, a path 55 in a case where the reference correction amount is used instead of the correction amount calculated by the correction amount calculation unit 32b is indicated by a broken line.

Figure 22:
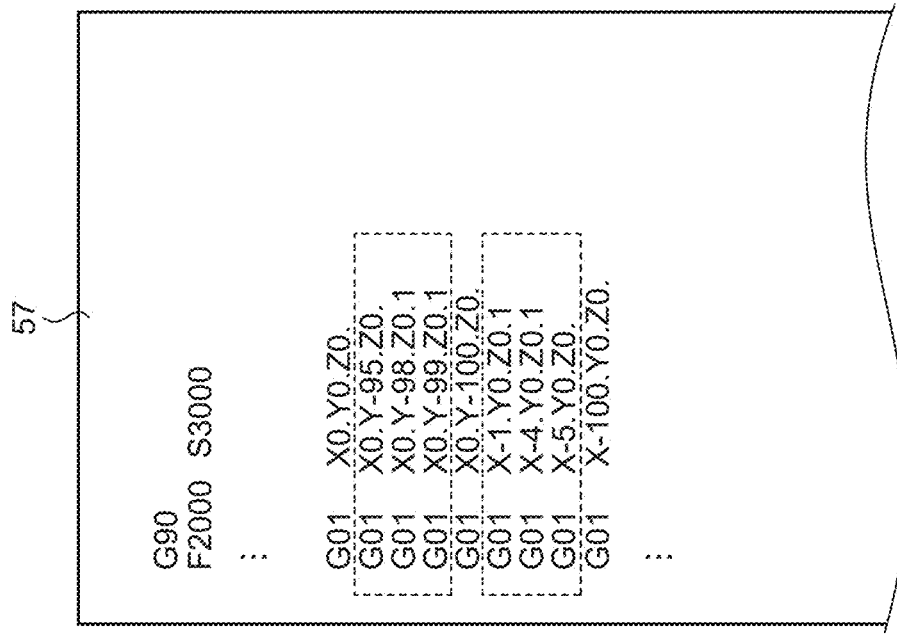
FIG. 22 is a diagram for explaining correction of the machining program by a machining program correction unit of the machining program generation device according to the fifth embodiment.
Figure 22:
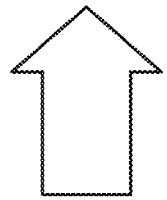
Figure 22:
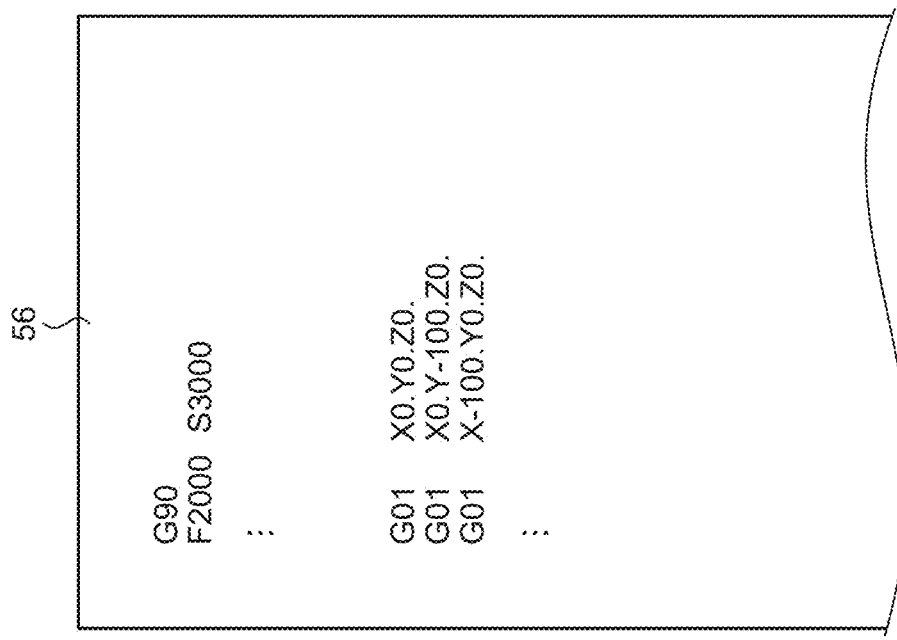

FIG. 22 is a diagram for explaining correction of the machining program by the machining program correction unit 52 of the machining program generation device 2 according to the fifth embodiment. FIG. 22 illustrates a machining program 56 as an example of the pre-change machining program and a machining program 57 as an example of the post-change machining program. In the machining program 57, two parts enclosed by broken lines are each a program added for the correction motion. One of the two parts enclosed by the broken lines is a part describing the correction motion for sequentially moving the tool 76 from P11 to P12, P13, and P14. The other of the two parts enclosed by the broken lines is a part describing the correction motion for sequentially moving the tool 76 from P14 to P15, P16, and P17.

Figure 23:
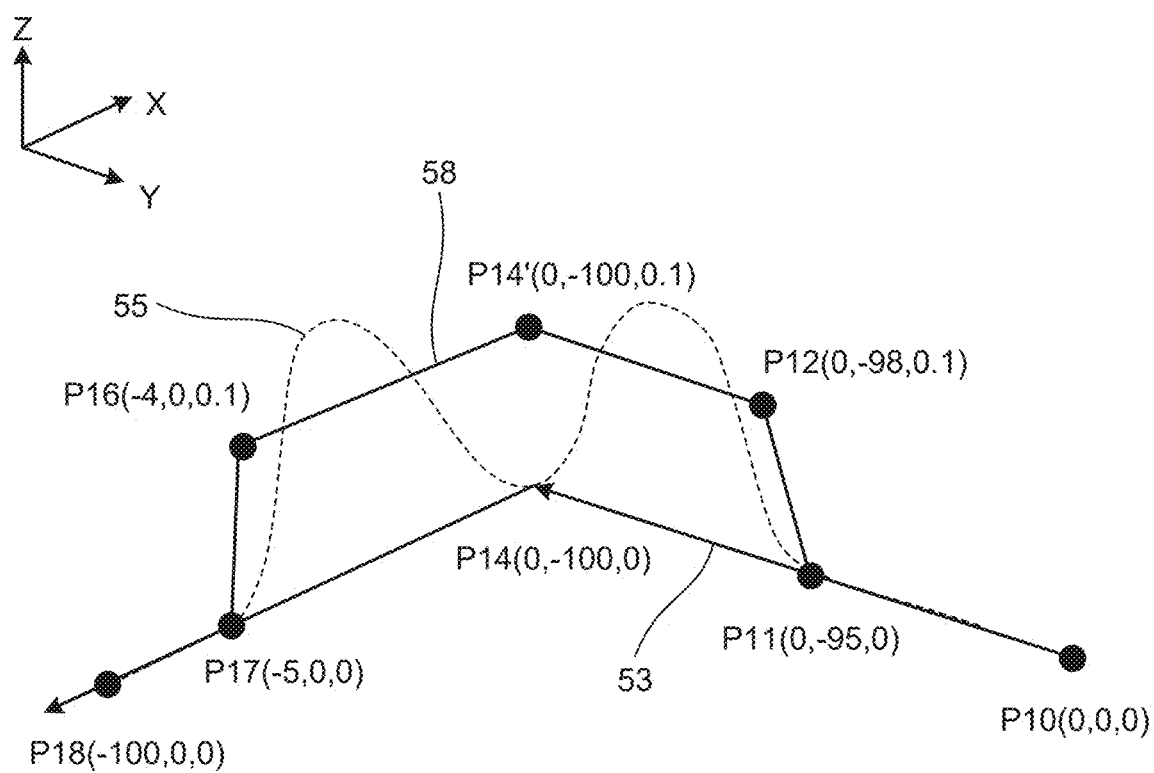
FIG. 23 is a diagram for explaining a second example of the machining program generated by the machining program generation device according to the fifth embodiment.

As with the third embodiment, the machining program generation device 2 may perform correction time adjustment for keeping the correction amount for a certain period of time. FIG. 23 is a diagram for explaining a second example of the machining program generated by the machining program generation device 2 according to the fifth embodiment.

The machining program generation device 2 includes the correction amount arithmetic unit 14c illustrated in FIG. 13 instead of the correction amount arithmetic unit 14a illustrated in FIG. 19. The correction amount arithmetic unit 14c includes the correction amount calculation unit 32c illustrated in FIG. 15. The correction amount arithmetic unit 14c includes the correction amount calculation unit 32c including the correction time adjustment unit 36 to keep the correction amount for the certain period of time when the correction amount reaches the upper limit value or the lower limit value that is the reference of the clamp processing.

For example, when the machining path is corrected as illustrated in FIG. 21 by the machining program correction unit 52, two correction motions are performed in a row within a range of 2 mm or less at the corner. In this case, the correction motion in a short distance is repeated at the corner. In the example illustrated in FIG. 23, the machining program generation device 2 performs arithmetic, using the correction amount arithmetic unit 14c, to find the correction amount kept at the upper limit value for a certain period of time, thereby putting the two correction motions into one correction motion and adding the correction motion to the pre-change machining program.

A path 58 illustrated in FIG. 23 is a machining path indicated in the post-change machining program. The path 58 includes a path sequentially passing through P11, P12, P14', P16, and P17 instead of the path sequentially passing through P11, P14, and P17 in the path 53.

The machining program generation device 2 keeps the correction amount for the certain period of time when the correction amount reaches the upper limit value or the lower limit value, thereby allowing the machining of a portion, such as the corner where the machining error can occur in succession, to proceed without reducing the correction amount. The machining program generation device 2 can avoid occurrence of a flaw due to an overshoot when the correction motion is repeated in a short distance. As a result, the machining program generation device 2 can prevent a decrease in quality of the machining surface.

According to the fifth embodiment, the machining program generation device 2 estimates the error direction and the error amount on the basis of the axis data and the machine model, and performs arithmetic to obtain the correction amount. In a case where the machining error due to the deformation of the mechanical structure 98 occurs by acceleration/deceleration of the axis drive units for the axes, the machining program generation device 2 can correct only the machining error in the axial direction that affects machining. The machining program generation device 2 does not correct the machining error in the axial direction that does not affect machining, thereby being able to reduce a decrease in the machining accuracy that is a concern when unnecessary correction is made. As described above, the machining program generation device 2 has an effect of being able to reduce the machining error caused by the deformation of the mechanical structure 98.

Sixth Embodiment

Figure 24:
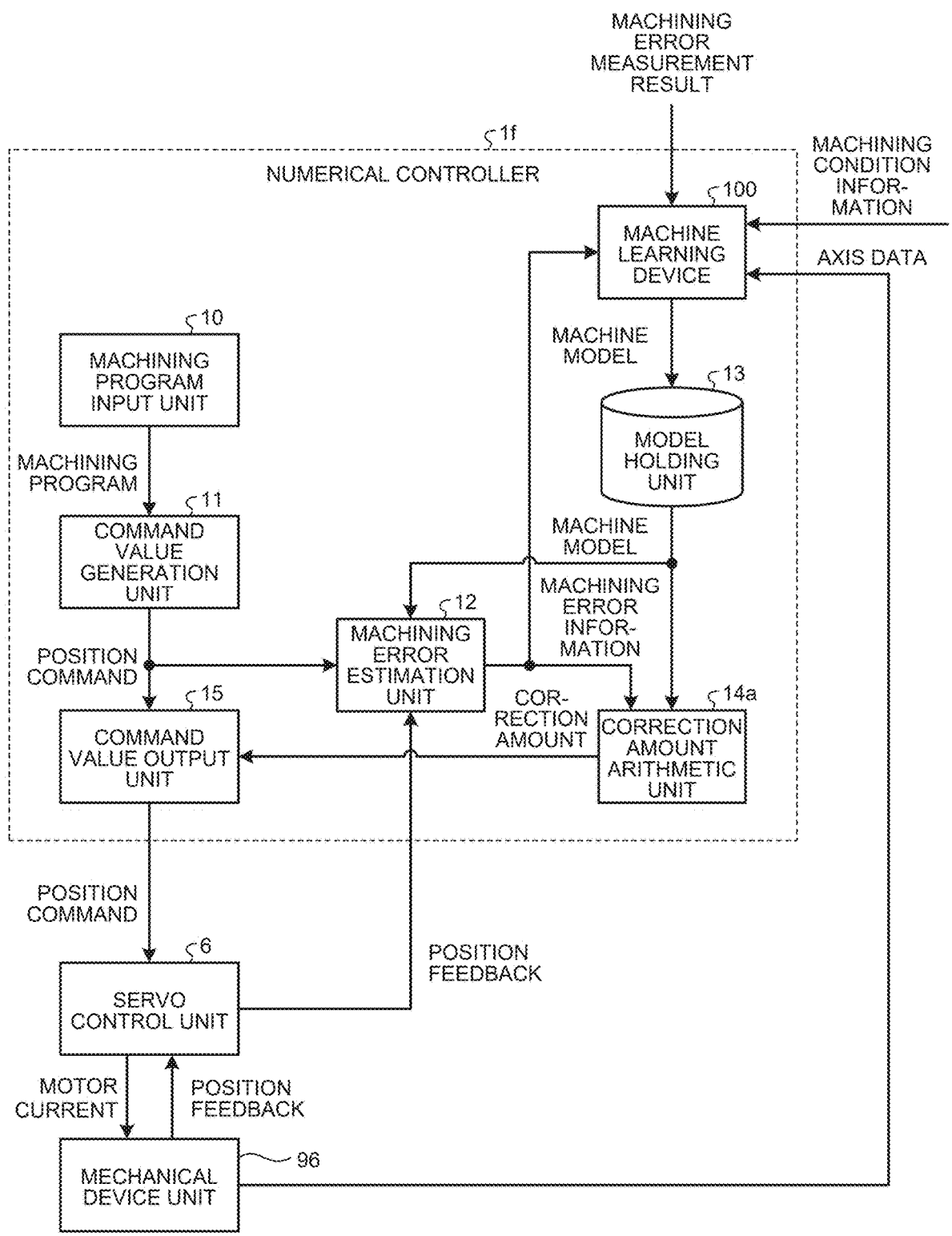
FIG. 24 is a diagram illustrating an exemplary configuration of a numerical controller according to a sixth embodiment.

A sixth embodiment will describe an example of learning the machine model by machine learning. FIG. 24 is a diagram illustrating an exemplary configuration of a numerical controller 1f according to the sixth embodiment. In the sixth embodiment, components identical to those in the above first to fifth embodiments are denoted by the same reference numerals as those assigned to such components in the first to fifth embodiments, and a configuration different from that of the first to fifth embodiments will be mainly described. FIG. 24 illustrates the numerical controller 1f, the servo control unit 6, and the mechanical device unit 96.

The numerical controller 1f includes a configuration similar to that of the numerical controller 1a illustrated in FIG. 6, the configuration including the machining program input unit 10, the command value generation unit 11, the machining error estimation unit 12, the model holding unit 13, the correction amount arithmetic unit 14a, and the command value output unit 15. The numerical controller 1f further includes a machine learning device 100 that learns the machine model. Here, the numerical controller 1f is assumed to be a combination of the configuration of the numerical controller 1a described in the first embodiment and the machine learning device 100. The numerical controller 1f may be a combination of the configuration of the numerical controller 1a of the second, third, or fourth embodiment and the machine learning device 100.

The machine learning device 100 receives input of the axis data, machining condition information, a machining error measurement result, and the machining error information. The machine learning device 100 receives, from the mechanical device unit 96, input of one or more pieces of data among the position command, the velocity command, the acceleration command, the position feedback, the velocity feedback, or the acceleration feedback as the axis data for each position of each axis of the numerical control machine tool 99a. The axis data may be input from the servo control unit 6 to the machine learning device 100.

The machining condition information is information on machining conditions of the numerical control machine tool 99a. The machining condition information includes information such as a shape of the workpiece 78, a material of the workpiece 78, a tool diameter, a tool material, a tool shape, the number of blades, a feed rate per blade, a rotational speed of the tool 76, mechanical structure information, tool friction information, and tool use time. The mechanical structure information is information characterizing the configuration of the mechanical structure 98.

The machining error measurement result is a result of measuring the machining error in actual machining. The machining error measurement result may include a result of determination of the presence or absence of the machining error. The result of determination of the presence or absence of the machining error may be a result of visually determining the presence or absence of the machining error by a worker or the like who uses the numerical control machine tool 99a. As the machining error measurement result, information on the magnitude of the machining error extracted from unevenness information of the machining surface may be used. The unevenness information of the machining surface is acquired by using a device such as a coordinate measuring machine (CMM) or a microscope. Alternatively, as the machining error measurement result, an output signal of an acceleration sensor attached in the vicinity of the tool 76 may be used. As the machining error measurement result, a result of observing an operation of the numerical control machine tool 99a simulating machining may be used. For example, a displacement sensor such as a laser displacement meter may be attached instead of the tool 76, and an output signal of the displacement sensor obtained when the numerical control machine tool 99a is operated similarly to the time of machining may be used as the machining error measurement result.

Figure 25:
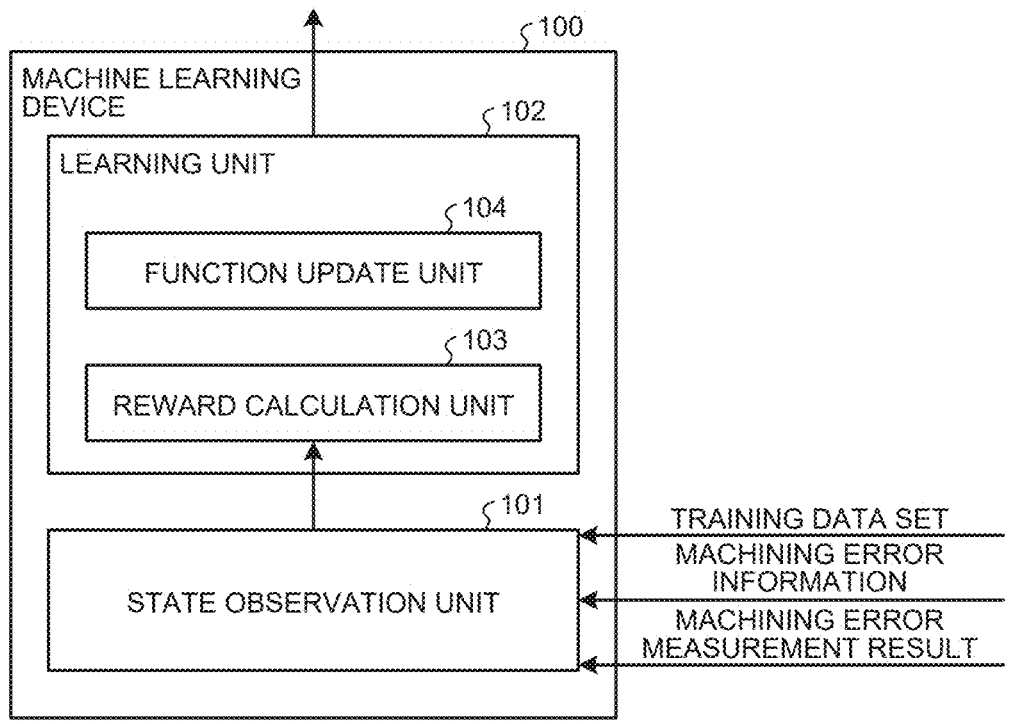
FIG. 25 is a diagram illustrating an exemplary configuration of a machine learning device included in the numerical controller according to the sixth embodiment.

FIG. 25 is a diagram illustrating an exemplary configuration of the machine learning device 100 included in the numerical controller 1f according to the sixth embodiment. The machine learning device 100 includes a state observation unit 101 and a learning unit 102. The state observation unit 101 observes a training data set, the machining error measurement result, and the machining error information as state variables. The training data set is a data set including the axis data and the machining condition information. The learning unit 102 learns the machine model in accordance with the training data set. Specifically, the learning unit 102 learns parameters of the machine model such as a coefficient for describing the amount of deformation of the mechanical structure 98, a frequency for describing the deformation of the mechanical structure 98, and a damping coefficient for describing the deformation of the mechanical structure 98.

The learning unit 102 may use any learning algorithm. As an example, a case will be described where reinforcement learning is applied as the learning algorithm used by the learning unit 102. In reinforcement learning, a subject as an agent acting in a certain environment observes a current state and determines an action to take. The agent receives a reward from the environment by choosing an action and learns a policy that maximizes the reward through a series of actions. As representative methods of reinforcement learning, Q learning, TD learning, and the like are known. For example, in the case of Q learning, an action-value table that is a typical update expression of an action-value function Q (s, a) is expressed by the following Formula (12). The action-value function Q (s, a) represents an action value Q that is a value of an action of choosing an action "a" under an environment "s".

Formula 12

$$Q(s_t, a_t) \leftarrow Q(s_t, a_t) + \alpha\left(r_{t+1} + \gamma\max_s Q(s_{t+1}, a_t) - Q(s_t, a_t)\right) \quad (12)$$

In the above Formula (12), "$s_{t+1}$" represents an environment at time "t". An action at time "t" is represented by "$a_t$". The action "$a_t$" changes the environment to "$s_{t+1}$". A reward earned by the change in the environment is represented by "rt,". A discount factor is represented by "γ". A learning rate is represented by "α". In a case where Q-learning is applied, the parameter of the machine model is the action "$a_t$".

The update expression expressed by Formula (12) above increases the action value Q if the action value of the action "a" that is the best action at time "t+1" is higher than the action value Q of the action "a" taken at time "t", or decreases the action value Q in an opposite case. In other words, the action-value function Q (s, a) is updated such that the action value Q of the action "a" at time "t" approaches the best action value at time "t+1". As a result, the best action value in a certain environment sequentially propagates to action values in previous environments.

The learning unit 102 includes a reward calculation unit 103 and a function update unit 104. The reward calculation unit 103 calculates a reward on the basis of the state variables. The function update unit 104 updates a function for determining the parameter of the machine model according to the reward calculated by the reward calculation unit 103.

Specifically, the reward calculation unit 103 calculates a reward "r" on the basis of the error amount indicated in the machining error information and the machining error measurement result. For example, in a case where the machining error measurement result matches the error amount indicated in the machining error information, the reward calculation unit 103 increases the reward "r". The reward calculation unit 103 increases the reward "r" by giving "1" as the value of the reward. Note that the value of the reward is not limited to "1". In a case where the machining error measurement result does not match the error amount indicated in the machining error information, the reward calculation unit 103 decreases the reward "r". The reward calculation unit 103 decreases the reward "r" by giving "−1" as the value of the reward. Note that the value of the reward is not limited to "−1".

The function update unit 104 updates the function for determining the parameter of the machine model according to the reward calculated by the reward calculation unit 103. The function can be updated by, for example, updating the action-value table according to the training data set. The action-value table is a data set in which an arbitrary action and its action value are stored in association with each other in a table form. For example, in the case of Q learning, the action-value function Q $(s_t, a_t)$ expressed by the above Formula (12) is used as the function for determining the parameter of the machine model. The machine learning device 100 outputs the machine model, which is a learning result in the learning unit 102, to the model holding unit 13.

The learning unit 102 may learn the machine model by collectively putting information on all the axes of the numerical control machine tool 99a into the training data set, or may construct the training data set for each axis of the numerical control machine tool 99a and learn the machine model for each axis.

The description has been made of the case where reinforcement learning is applied as the learning algorithm used by the learning unit 102, but learning other than reinforcement learning may be applied as the learning algorithm. The learning unit 102 may perform learning using a neural network with the training data set as an input and the parameter of the machine model as an output. The learning unit 102 may execute machine learning using the learning algorithm such as deep learning, genetic programming, inductive logic programming, or support vector machine, for example.

The learning unit 102 is not limited to one built in the numerical controller 1f. The learning unit 102 may be implemented by a device outside the numerical controller 1f. In this case, the device functioning as the learning unit 102 may be a device connectable to the numerical controller 1f via a network. The device functioning as the learning unit 102 may be a device on a cloud server.

According to the sixth embodiment, the numerical controller 1f has an effect of being able to predict the machining error with high accuracy by learning the machine model in a case where the condition of occurrence of the machining error changes complicatedly depending on the machining condition.

Next, hardware for implementing the numerical controllers 1a and 1f according to the first to sixth embodiments will be described. In the numerical controllers 1a and 1f, the processing units being the machining program input unit 10, the command value generation unit 11, the machining error estimation unit 12, the correction amount arithmetic units 14a and 14c, the command value output unit 15, and the machine learning device 100 are implemented by processing circuitry. The processing circuitry may be circuitry in which a processor executes software, or may be dedicated circuitry.

Figure 26:
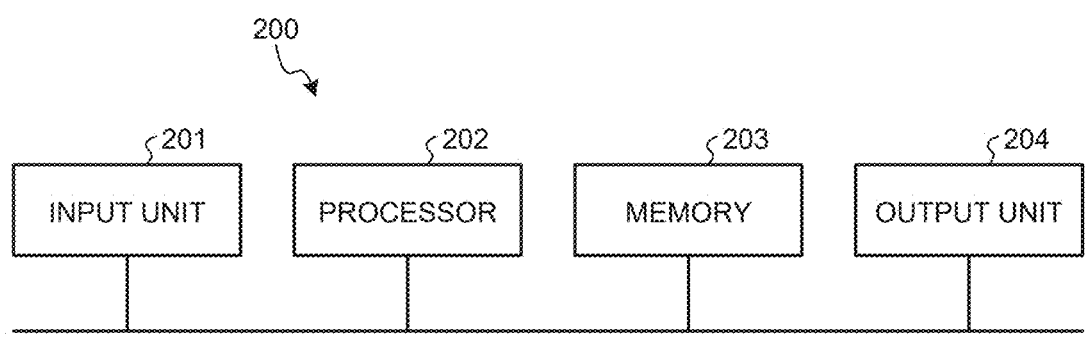
FIG. 26 is a diagram illustrating an exemplary configuration of a control circuit according to the first to sixth embodiments.

In a case where the processing circuitry is implemented by the software, the processing circuitry is, for example, a control circuit illustrated in FIG. 26. FIG. 26 is a diagram illustrating an exemplary configuration of a control circuit 200 according to the first to sixth embodiments. The control circuit 200 includes an input unit 201, a processor 202, a memory 203, and an output unit 204. The input unit 201 is an interface circuit that receives data input from the outside of the control circuit 200 and gives the data to the processor 202. The output unit 204 is an interface circuit that sends data from the processor 202 or the memory 203 to the outside of the control circuit 200.

In the case where the processing circuitry is the control circuit 200 illustrated in FIG. 26, the aforementioned processing units are implemented by software, firmware, or a combination of software and firmware. The software or firmware is described as programs and stored in the memory 203. The processing circuitry implements the functions by the processor 202 reading and executing the programs stored in the memory 203. That is, the processing circuitry includes the memory 203 for storing the programs that result in the execution of the processing of the numerical controllers 1a and 1f. It can also be said that these programs cause a computer to execute the procedure and method related to the numerical controllers 1a and 1f.

The processor 202 is a central processing unit (CPU), a processing unit, an arithmetic unit, a microprocessor, a microcomputer, a processor, or a digital signal processor (DSP). The memory 203 corresponds to, for example, a non-volatile or volatile semiconductor memory such as a random access memory (RAM), a read only memory (ROM), a flash memory, an erasable programmable read only memory (EPROM), or an electrically erasable programmable read only memory (EEPROM (registered trademark)), a magnetic disk, a flexible disk, an optical disk, a compact disc, a mini disc, a digital versatile disc (DVD), or the like.

Figure 27:
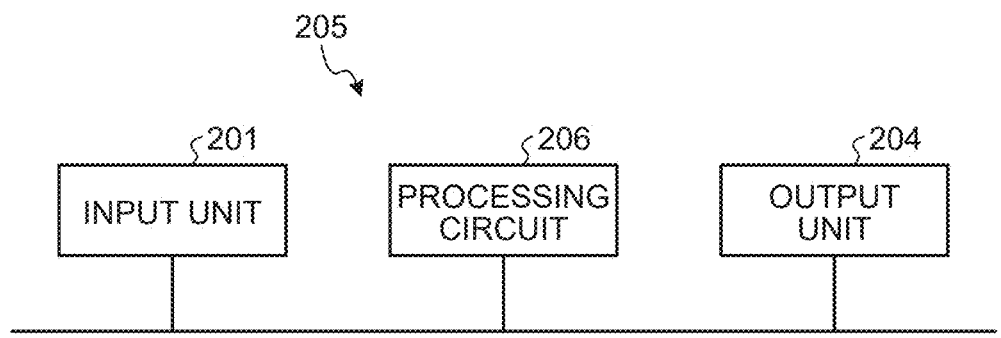
FIG. 27 is a diagram illustrating an exemplary configuration of a hardware circuit that is dedicated according to the first to sixth embodiments.

FIG. 26 is the example of the hardware in the case where the components are implemented by the processor 202 and the memory 203 that are for general purpose use, but the components may be implemented by a hardware circuit that is dedicated. FIG. 27 is a diagram illustrating an exemplary configuration of a hardware circuit 205 that is dedicated according to the first to sixth embodiments.

The hardware circuit 205 that is dedicated includes the input unit 201, the output unit 204, and a processing circuit 206. The processing circuit 206 is a single circuit, a complex circuit, a programmed processor, a parallel-programmed processor, an application specific integrated circuit (ASIC), a field programmable gate array (FPGA), or a circuit obtained by combining these. The functions of the numerical controllers 1a and 1f may be implemented individually or collectively by the processing circuit 206. Note that the components may be implemented by a combination of the control circuit 200 and the hardware circuit 205.

The machining program generation device 2 illustrated in FIG. 19 is implemented by a hardware configuration similar to the hardware configuration illustrated in FIG. 26 or by a hardware configuration similar to the hardware configuration illustrated in FIG. 27. In the machining program generation device 2, the processing units being the machining program input unit 10, the machining error estimation unit 12, the correction amount arithmetic unit 14a, the simulation unit 51, and the machining program correction unit 52 are implemented by processing circuitry. The processing circuitry may be circuitry in which a processor executes software, or may be dedicated circuitry.

In a case where the learning unit 102 illustrated in FIG. 25 is implemented by a device outside the numerical controller 1f, the device functioning as the learning unit 102 is implemented by a hardware configuration similar to the hardware configuration illustrated in FIG. 26 or by a hardware configuration similar to the hardware configuration illustrated in FIG. 27. The device functioning as the learning unit 102 is implemented by processing circuitry. The processing circuitry may be circuitry in which a processor executes software, or may be dedicated circuitry.

The configurations illustrated in the above embodiments each illustrate an example of the content of the present disclosure. The configurations of the embodiments can be combined with another known technique. The configurations of the embodiments may be combined together as appropriate. A part of the configurations of the embodiments can be omitted or modified without departing from the scope of the present disclosure.

REFERENCE SIGNS LIST 1a, 1f numerical controller; 2 machining program generation device; 6 servo control unit; 10 machining program input unit; 11 command value generation unit; 12 machining error estimation unit; 13 model holding unit; 14a, 14c correction amount arithmetic unit; 15 command value output unit; 20 machining error shape; 21 direction of motion; 23, 24, 42, 43 arrow; 25, 26 circle; 31a, 31c axis selection unit; 32a, 32b, 32c correction amount calculation unit; 33 reference correction amount calculation unit; 34 clamp unit; 35 change rate calculation unit; 36 correction time adjustment unit; 41 machining surface; 51 simulation unit; 52 machining program correction unit; 53, 54, 55, 58 path; 56, 57 machining program; 71 motor; 72 linear guide mechanism; 73 feed screw; 74 coupling; 75a, 75b support bearing; 76 tool; 77 work table; 78 workpiece; 79 speed reducer; 80 nut; 82 rotation angle detector; 83 spindle; 90 support; 93A A-axis drive unit; 93B B-axis drive unit; 93C C-axis drive unit; 93V V-axis drive unit; 93X X-axis drive unit; 93Y Y-axis drive unit; 93Z Z-axis drive unit; 96 mechanical device unit; 97 drive mechanism; 98 mechanical structure; 99a, 99d, 99e numerical control machine tool; 100 machine learning device; 101 state observation unit; 102 learning unit; 103 reward calculation unit; 104 function update unit; 200 control circuit; 201 input unit; 202 processor; 203 memory; 204 output unit; 205 hardware circuit; 206 processing circuit.

The invention claimed is:

1. A numerical controller that controls a numerical control machine tool, the numerical control machine tool including a drive mechanism provided for each of a plurality of axes, including a mechanical structure to perform motion by power that is transmitted from the drive mechanism, and machining a workpiece using a tool attached to the mechanical structure, the numerical controller comprising:
model holding circuitry that holds a machine model, the machine model being a model that simulates deformation of the mechanical structure accompanying the motion of the mechanical structure in axial directions and representing an error amount as an amount of displacement of the tool in the axial directions due to the deformation of the mechanical structure, the axial directions being directions of corresponding ones of the plurality of the axes;
machining error estimation circuitry to estimate an error direction and the error amount in the error direction on the basis of axis data that is data on drive of the drive mechanism and the machine model, and output machining error information indicating the error direction estimated and the error amount estimated, the error direction being a direction different from a direction of the motion of the mechanical structure among the axial directions and being a direction in which displacement of the tool occurs; and
correction amount arithmetic circuitry to select one or more of the axes subject to correction on the basis of the machining error information, and perform arithmetic to find a correction amount that is used for correction of a command to be output to the drive mechanism for the axis selected, wherein
the machine model is a machine model in which the error amount is not zero in any of the direction different from the direction of the motion of the mechanical structure among the axial directions.

2. The numerical controller according to claim 1, wherein the axis data is one or more data among a velocity command of each axis, an acceleration command of each axis, or velocity or acceleration that is a state quantity of the drive mechanism of each axis.

3. The numerical controller according to claim 2, wherein the correction amount arithmetic circuitry calculates a change rate for changing the correction amount, and outputs the correction amount changed in accordance with the change rate.

4. The numerical controller according to claim 2, wherein the correction amount arithmetic circuitry outputs the correction amount when the tool moves toward a machining surface of the workpiece in the error direction, or sets the correction amount to zero when the tool moves away from the machining surface in the error direction.

5. The numerical controller according to claim 2, comprising:
state observation circuitry to observe the axis data, information on a machining condition of the numerical control machine tool, a machining error measurement result, and the machining error information as state variables; and
learning circuitry to learn the machine model in accordance with a data set created on the basis of the state variables.

6. The numerical controller according to claim 1, wherein the correction amount arithmetic circuitry outputs the correction amount subjected to clamp processing.

7. The numerical controller according to claim 6, wherein the correction amount arithmetic circuitry keeps the correction amount for a certain period of time when the correction amount reaches an upper limit value or a lower limit value that is a reference of the clamp processing.

8. The numerical controller according to claim 7, wherein the correction amount arithmetic circuitry calculates a change rate for changing the correction amount, and outputs the correction amount changed in accordance with the change rate.

9. The numerical controller according to claim 7, wherein the correction amount arithmetic circuitry outputs the correction amount when the tool moves toward a machining surface of the workpiece in the error direction, or sets the correction amount to zero when the tool moves away from the machining surface in the error direction.

10. The numerical controller according to claim 7, comprising:
state observation circuitry to observe the axis data, information on a machining condition of the numerical control machine tool, a machining error measurement result, and the machining error information as state variables; and
learning circuitry to learn the machine model in accordance with a data set created on the basis of the state variables.

11. The numerical controller according to claim 6, wherein the correction amount arithmetic circuitry calculates a change rate for changing the correction amount, and outputs the correction amount changed in accordance with the change rate.

12. The numerical controller according to claim 6, wherein the correction amount arithmetic circuitry outputs the correction amount when the tool moves toward a machining surface of the workpiece in the error direction, or sets the correction amount to zero when the tool moves away from the machining surface in the error direction.

13. The numerical controller according to claim 6, comprising:
state observation circuitry to observe the axis data, information on a machining condition of the numerical control machine tool, a machining error measurement result, and the machining error information as state variables; and
learning circuitry to learn the machine model in accordance with a data set created on the basis of the state variables.

14. The numerical controller according to claim 1, wherein the correction amount arithmetic circuitry calculates a change rate for changing the correction amount, and outputs the correction amount changed in accordance with the change rate.

15. The numerical controller according to claim 1, wherein the correction amount arithmetic circuitry outputs the correction amount when the tool moves toward a machining surface of the workpiece in the error direction, or sets the correction amount to zero when the tool moves away from the machining surface in the error direction.

16. The numerical controller according to claim 1, comprising:
state observation circuitry to observe the axis data, information on a machining condition of the numerical control machine tool, a machining error measurement result, and the machining error information as state variables; and
learning circuitry to learn the machine model in accordance with a data set created on the basis of the state variables.

17. A numerical control machine tool that includes a drive mechanism provided for each of a plurality of axes, includes a mechanical structure to perform motion by power that is transmitted from the drive mechanism, and machines a workpiece using a tool attached to the mechanical structure, the numerical control machine tool comprising:
model holding circuitry that holds a machine model, the machine model being a model that simulates deformation of the mechanical structure accompanying the motion of the mechanical structure in axial directions and representing an error amount as an amount of displacement of the tool in the axial directions due to the deformation of the mechanical structure, the axial directions being directions of corresponding ones of the plurality of the axes;
machining error estimation circuitry to estimate an error direction and the error amount in the error direction on the basis of axis data that is data on drive of the drive mechanism and the machine model, and output machining error information indicating the error direction estimated and the error amount estimated, the error direction being a direction different from a direction of the motion of the mechanical structure among the axial directions and being a direction in which displacement of the tool occurs; and
correction amount arithmetic circuitry to select one or more of the axes subject to correction on the basis of the machining error information, and perform arithmetic to find a correction amount that is used for correction of a command to be output to the drive mechanism for the axis selected, wherein
the machine model is a machine model in which the error amount is not zero in any of the direction different from the direction of the motion of the mechanical structure among the axial directions.

18. A machining program generation device that generates a machining program of a numerical control machine tool, the numerical control machine tool including a drive mechanism provided for each of a plurality of axes, including a mechanical structure to perform motion by power that is transmitted from the drive mechanism, and machining a workpiece using a tool attached to the mechanical structure, the machining program generation device comprising:
model holding circuitry that holds a machine model, the machine model being a model that simulates deformation of the mechanical structure accompanying the motion of the mechanical structure in axial directions and representing an error amount as an amount of displacement of the tool in the axial directions due to the deformation of the mechanical structure, the axial directions being directions of corresponding ones of the plurality of the axes;
machining error estimation circuitry to estimate an error direction and the error amount in the error direction on the basis of axis data that is data on drive of the drive mechanism and the machine model, and output machining error information indicating the error direction estimated and the error amount estimated, the error direction being a direction different from a direction of the motion of the mechanical structure among the axial directions and being a direction in which displacement of the tool occurs;
correction amount arithmetic circuitry to select one or more of the axes subject to correction on the basis of the machining error information, and perform arithmetic to find a correction amount for correcting the motion due to the drive mechanism for the axis selected; and
machining program correction circuitry to correct the machining program in accordance with the correction amount, wherein
the machine model is a machine model in which the error amount is not zero in any of the direction different from the direction of the motion of the mechanical structure among the axial directions.

19. The machining program generation device according to claim 18, further comprising a simulation circuitry to calculate the axis data on the basis of a machining path that is analyzed from the machining program before the correction amount is described in the machining program.

20. A machining program generation method that generates a machining program of a numerical control machine tool, the numerical control machine tool including a drive mechanism provided for each of a plurality of axes, including a mechanical structure to perform motion by power that is transmitted from the drive mechanism, and machining a workpiece using a tool attached to the mechanical structure, the machining program generation method comprising:
  reading a machine model, the machine model being a model that simulates deformation of the mechanical structure accompanying the motion of the mechanical structure in axial directions and representing an error amount as an amount of displacement of the tool in the axial directions due to the deformation of the mechanical structure, the axial directions being directions of corresponding ones of the plurality of the axes;
  estimating an error direction and the error amount in the error direction on the basis of axis data that is data on drive of the drive mechanism and the machine model, and outputting machining error information indicating the error direction estimated and the error amount estimated, the error direction being a direction different from a direction of the motion of the mechanical structure among the axial directions and being a direction in which displacement of the tool occurs;
  selecting one or more of the axes subject to correction on the basis of the machining error information, and performing arithmetic to find a correction amount for correcting the motion due to the drive mechanism for the axis selected; and
  correcting the machining program in accordance with the correction amount, wherein
  the machine model is a machine model in which the error amount is not zero in any of the direction different from the direction of the motion of the mechanical structure among the axial directions.

* * * * *